United States Patent
Yao et al.

(10) Patent No.: US 12,086,289 B2
(45) Date of Patent: Sep. 10, 2024

(54) SECURE DATA BACKUP METHOD, SECURE DATA RESTORATION METHOD, AND ELECTRONIC DEVICE

(71) Applicant: HUAWEI TECHNOLOGIES CO., LTD., Guangdong (CN)

(72) Inventors: Hui Yao, Dongguan (CN); Shuaihong Gao, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 363 days.

(21) Appl. No.: 17/442,737

(22) PCT Filed: Mar. 25, 2020

(86) PCT No.: PCT/CN2020/081159
§ 371 (c)(1),
(2) Date: Sep. 24, 2021

(87) PCT Pub. No.: WO2020/192698
PCT Pub. Date: Oct. 1, 2020

(65) Prior Publication Data
US 2022/0253537 A1    Aug. 11, 2022

(30) Foreign Application Priority Data
Mar. 27, 2019 (CN) .......................... 201910240109.5

(51) Int. Cl.
*G06F 21/62* (2013.01)
*G06F 21/60* (2013.01)
*H04L 9/14* (2006.01)

(52) U.S. Cl.
CPC ........ *G06F 21/6272* (2013.01); *G06F 21/602* (2013.01); *H04L 9/14* (2013.01)

(58) Field of Classification Search
CPC .................................................. G06F 21/6272
See application file for complete search history.

(56) References Cited

U.S. PATENT DOCUMENTS 10,263,778 B1 * 4/2019 Grubin ................. H04L 9/0841
2004/0203600 A1 * 10/2004 McCorkle ............ H04L 63/162
455/411

(Continued)

FOREIGN PATENT DOCUMENTS

CN        102609641 A    7/2012
CN        102932333 A    2/2013

(Continued)

OTHER PUBLICATIONS

Dominik Sch Rmann et al, OpenKeychain: An Architecture for Cryptography with Smart Cards and NFC Rings on Android, Proceedings of the ACM on Interactive, Mobile, Wearable and Ubiquitous Technologies, vol. 1, No. 3, Article 99. Publication date:Sep. 2017, 24 pages.

(Continued)

*Primary Examiner* — Bradley W Holder
(74) *Attorney, Agent, or Firm* — HUAWEI TECHNOLOGIES CO., LTD.

(57) ABSTRACT

This application provides a data encryption method, a data decryption method, a secure data backup method, a secure data restoration method, and an electronic device. Different types of data packets in the card data are separately encrypted by using a secure element SE and a trusted execution environment TEE. In the encryption process, a user and a third-party card data provider are introduced, and are separately responsible for generation, storage, and delivery of one of key factors. Then, a real backup key is generated with reference to a key factor provided by a mobile phone party. After being encrypted in the SE and the TEE by using the backup key, the card data is uploaded to a cloud server for backup. The application can ensures data backup security in the SE and the TEE.

20 Claims, 15 Drawing Sheets

(56) References Cited

U.S. PATENT DOCUMENTS

| | | |
|---|---|---|
| 2009/0228719 A1 | 9/2009 | Almgren et al. |
| 2013/0226812 A1 | 8/2013 | Landrok et al. |
| 2014/0068258 A1* | 3/2014 | Chao .................. G06F 11/1469 |
| | | 713/167 |
| 2015/0301897 A1 | 10/2015 | Jeon et al. |
| 2017/0063827 A1 | 3/2017 | Ricardo |
| 2018/0176013 A1* | 6/2018 | Cheng .................... G06F 21/64 |
| 2018/0367316 A1* | 12/2018 | Cheng .................... G06F 21/72 |

FOREIGN PATENT DOCUMENTS

| | | |
|---|---|---|
| CN | 103269326 A | 8/2013 |
| CN | 103888938 A | 6/2014 |
| CN | 105959108 A | 9/2016 |
| CN | 107257328 A | 10/2017 |
| CN | 107483213 A | 12/2017 |
| CN | 108055129 A | 5/2018 |
| CN | 108256850 A | 7/2018 |
| CN | 108335105 A | 7/2018 |
| CN | 110086609 A | 8/2019 |
| EP | 3343488 A1 | 7/2018 |

OTHER PUBLICATIONS

Andrei Dragan, Encryption and Decryption of Messages on Android using NFC Tags, Journal of Mobile, Embedded and Distributed Systems, vol. VII, No. 3, 2015, 6 pages.

* cited by examiner

SECURE DATA BACKUP METHOD, SECURE DATA RESTORATION METHOD, AND ELECTRONIC DEVICE

CROSS-REFERENCE TO RELATED APPLICATIONS

This application is a national stage of International Application No. PCT/CN2020/081159, filed on Mar. 25, 2020, which claims priority to Chinese Patent Application No. 201910240109.5, filed on Mar. 27, 2019. Both of the aforementioned applications are hereby incorporated by reference in their entireties.

TECHNICAL FIELD

This application relates to the field of electronic technologies, and in particular, to a data encryption method, a data decryption method, a secure data backup method, a secure data restoration method, and an electronic device.

BACKGROUND

Terminal devices play an increasingly important role in daily life. For example, a mobile phone may carry a large amount of personal data of a user, such as a bank card, a bus card, an access card, an identity card, a photo, and a contact business card. When the user replaces the mobile phone, the personal data of the user may be backed up to a cloud provided by a mobile phone manufacturer, so that the user can restore the personal data to a new mobile phone.

SUMMARY

This application provides a data encryption method, a decryption method, a secure data backup method, a secure data restoration method, and an electronic device, to ensure data backup security and restoration in an SE and a TEE.

According to a first aspect, a data encryption method is provided. The method is applied to an electronic device, and the electronic device includes a secure element. The method includes: The secure element obtains first data, where the first data is data written about a first card when the first card is added to a first application. The secure element receives a first key factor sent by a trusted service manager TSM, where the first key factor is a key factor generated based on user information in the first application. The secure element receives a second key factor sent by a server corresponding to the first card. The secure element generates a first backup key based on the first key factor and the second key factor. The secure element encrypts the first data by using the first backup key.

It should be understood that the card for backup in this application may be a card supporting near field communication (near field communication, NFC), for example, an NFC card such as an access card, a bank card, a bus card, an identity card, a fitness membership card, a shopping mall membership card, a smart staff card, or a student card. The card may be in a form of a common physical card or in a form of an electronic card. Alternatively, the card may be account information, a user permission, and the like added to a Huawei wallet application, or a card that is in another form and can be read and added to the Huawei wallet application. This is not limited in this application.

It should be further understood that, in a process of adding different cards to the Huawei wallet application, the first data is data written into the SE. This part of data relates to card information, and therefore has a relatively high security requirement. For example, the access card is used as an example. The first data may include a serial number of the access card. When the access card is written into the Huawei wallet application, the trusted service manager TSM (Trusted Service Manager, TSM) may create a security domain (security domain) in the SE, and writes the serial number of the access card into the security domain. In other words, the serial number of the access card is stored in the SE.

For another example, the bank card is used as an example. The first data may include a serial number and limit information of the bank card, transaction content and a transaction amount of a user, a personal identification number entered by the user, a key resource in a mobile payment service process, or the like. The foregoing data is written and stored in the security domain of the SE. This is not limited in this application.

It should be further understood that, in a process in which the secure element generates the first backup key based on the first key factor and the second key factor, the first key factor and the second key factor may be combined to generate the first backup key, or the first backup key is synthesized by using another key algorithm, for example, an RSA key generation algorithm, a triple data encryption algorithm (triple data encryption algorithm, 3DES), or the like. A manner of generating the first backup key is not limited in this application.

According to the foregoing technical solution, for the data written into the SE, in a data encryption process, a content provider (for example, an access card party) of the NFC card is introduced to generate and deliver a key factor (for example, the second key factor). In addition, in combination with another key factor (for example, the first key factor) provided by a mobile phone party (for example, a Huawei device), a real backup key (for example, the first backup key) is generated in the secure element SE of the mobile phone. In the security domain in the SE, sensitive data (for example, the first data) of the card is encrypted by using the first backup key. The encrypted sensitive data cannot be independently decrypted and restored by the mobile phone party (for example, the Huawei device) or a third party (for example, the access card party), to ensure data security.

Specifically, the data encryption method may be applied to a data backup process. A process of backing up NFC card data written into the Huawei wallet application is used as an example. The Huawei wallet application opens a path, so that a third-party service may write an NFC card into the Huawei wallet application, and a part of sensitive data (for example, the first data) of the third-party card is stored in the SE. When the part of sensitive data (for example, the first data) of the card is backed up from the SE, a content provider (for example, the access card party) of the NFC card is introduced to generate and deliver a key factor (for example, the second key factor). In other words, the content provider is responsible for security management of the second key factor. In addition, in combination with another key factor (for example, the first key factor) provided by the mobile phone party (for example, the Huawei device), a real backup key (for example, the first backup key) is generated in the secure element SE of the mobile phone. In the security domain of the SE, the sensitive data (for example, the first data) of the card is encrypted by using the first backup key and may be uploaded to a cloud for backup. The mobile phone party cannot learn the second key factor delivered by the access card party, and the access card party cannot learn the first key factor generated by the mobile phone party.

Neither party can independently determine the first backup key. In other words, the mobile phone party (for example, the Huawei device) or the third party (for example, the access card party) cannot independently decrypt and restore the sensitive data of the user. This implements reliable and secure backup of the data.

With reference to the first aspect, in some implementations of the first aspect, the electronic device further includes a processor, and the processor runs a trusted execution environment TEE. The method further includes: The processor obtains second data, where the second data includes data, in the first application, that is about an application system layer of the first card. The processor receives a third key factor sent by a server corresponding to the first application, where the third key factor is a key factor generated based on the user information in the first application. The processor obtains a fourth key factor. The processor generates a second backup key based on the third key factor and the fourth key factor. The processor encrypts the second data by using the second backup key.

It should be understood that the foregoing method for encrypting data by using the TEE may be separately used for data encryption, or the TEE may be combined with the SE to encrypt the card data written into the Huawei wallet application. This is not limited in this application.

It should be further understood that, in the foregoing process of writing the NFC card data into the Huawei wallet application, a part of data needs to be stored in the security domain of the SE, and the part of data relates to card information with a relatively high security requirement. The part of data stored in the security domain of the SE is referred to as the "first data". Other than the first data, another part of data needs to be stored at an Android system layer. In this embodiment of this application, the part of data stored at the Android system layer is referred to as the "second data", and the second data may include personalized user data, for example, a user name, a user image, a user gender, an address, or other data. In the data backup process, the second data may be encrypted at the Android system layer, to meet a security requirement.

Optionally, the second data may include only the part of data stored at the Android system layer.

Specifically, the access card is used as an example. The first data may include the serial number of the access card. When the access card is written into the Huawei wallet application, the TSM may create the security domain (security domain) in the SE, and write the serial number of the access card into the security domain. In other words, the serial number of the access card is stored in the SE. The second data may include the personalized user data, for example, the user name, the user gender, the user address, or other information; and the second data is stored at the Android system layer.

For another example, the bank card is used as an example. The first data may include the serial number of the bank card, the transaction content and the transaction amount of the user, the personal identification number entered by the user, the key resource in the mobile payment service process, or the like. The foregoing data is written and stored in the security domain of the SE. The second data may include the personalized user data, for example, the user name, the user image, the user gender, the address, or other data; and the second data is stored at the Android system layer.

For another example, in addition to various types of NFC cards in the Huawei wallet application, for the mobile phone, the second data may further include data such as an album of the user.

According to the foregoing technical solution, the mobile phone party cannot learn a third key factor delivered by the Huawei wallet application party, and the Huawei wallet application party cannot learn a fourth key factor generated by the mobile phone party or a fourth key factor delivered by the access card party. None of the parties can independently determine the second backup key. In other words, none of the parties can obtain the second data encrypted by using the second backup key. Therefore, when the second data is backed up and transmitted to a cloud server, security of the second data may be improved, to prevent any party from obtaining private data of the user.

It should be understood that a TA may generate the second backup key based on the third key factor and the fourth key factor. Optionally, the third key factor and the fourth key factor may be combined to generate the second backup key. Alternatively, the second backup key may be synthesized by using another key algorithm, for example, the RSA key generation algorithm or the 3DES encryption algorithm. A manner of generating the second backup key is not limited in this application.

With reference to the first aspect and the foregoing implementations, in some implementations of the first aspect, the second data further includes the first data encrypted by using the first backup key. Before the processor obtains the second data, the method further includes: The processor receives the first data that is encrypted by using the first backup key and sent by the secure element. After the processor encrypts the second data by using the second backup key, the method further includes: The processor uploads the encrypted second data to the cloud server for backup.

Optionally, in addition to the part of data stored at the Android system layer, the second data may further include a ciphertext of the first data encrypted by using the first backup key. Specifically, both the first data encrypted by using the first backup key and the personalized user data at the Android system layer are used as the second data, encrypted by using the second backup key, and then uploaded to the cloud server for backup. When the second data includes the first data, because the first data is further encrypted by using the second backup key, data backup security is further improved in a process of backing up the first data to the cloud server.

With reference to the first aspect and the foregoing implementations, in some implementations of the first aspect, the fourth key factor is a key factor generated by the server corresponding to the first card and sent to the processor.

Specifically, the access card is used as an example. A server corresponding to the access card delivers the fourth key factor to the TEE. Specifically, when the access card is written into the Huawei wallet application, the server corresponding to the access card needs to be notified. The server corresponding to the access card delivers the fourth key factor to the TEE, and stores the fourth key factor in the TA. In this implementation, the fourth key factor is also delivered after being encrypted by the server corresponding to the access card.

With reference to the first aspect and the foregoing implementations, in some implementations of the first aspect, the fourth key factor is a key factor randomly generated by the trusted application TA in the TEE run by the processor. The method further includes: The processor sends the fourth key factor to the server corresponding to the first card, where the fourth key factor is encrypted by using the third key factor; or the processor sends the fourth key factor to the server corresponding to the first application, where the fourth key factor is encrypted by using the third key factor.

Specifically, the access card is used as an example. In this implementation, the fourth key factor needs to be backed up.

Optionally, the TEE may encrypt the fourth key factor by using the third key factor, and then the TEE uploads the encrypted fourth key factor to the cloud server.

With reference to the first aspect and the foregoing implementations, in some implementations of the first aspect, before the processor sends the fourth key factor to the server corresponding to the first card, or the processor sends the fourth key factor to the server corresponding to the first application, the method further includes: The processor encrypts the fourth key factor according to a first authentication manner, where the first authentication manner is an authentication manner in which the user enters a password.

Specifically, when the encrypted fourth key factor is uploaded to the cloud server, an encryption window may be popped up on an interface of the Huawei wallet application, and the window may be used by the user to enter an authentication manner. For example, the user may enter the password manually or select a biometric authentication method supported by the mobile phone. Before uploading the encrypted fourth key factor, the TEE performs encryption by using the password manually entered by the user or the biometric authentication method. The biometric authentication method includes but is not limited to fingerprint recognition, facial information verification, infrared sensing, or the like.

After biometric authentication of the user is authorized, the Huawei wallet application sends a ciphertext of the fourth key factor that is encrypted twice to the cloud server for backup, or the Huawei wallet application sends a ciphertext of the fourth key factor that is encrypted twice to a wallet server for backup.

In the foregoing solution, participation of the user may further be introduced. The fourth key factor is further encrypted by using the biometric authentication input by the user, to ensure security of the fourth key factor, and prevent the fourth key factor from being stolen by the third party in the data backup process. This improves security of the data backup process.

With reference to the first aspect and the foregoing implementations, in some implementations of the first aspect, the third key factor received by the processor and sent by the server corresponding to the first application is encrypted by using a public key in a temporary key pair.

With reference to the first aspect and the foregoing implementations, in some implementations of the first aspect, the second key factor received by the secure element and sent by the server corresponding to the first card is encrypted by the TSM by using the public key in the temporary key pair.

It should be understood that, in a process of delivering the second key factor and the third key factor, interaction between a plurality of servers is involved, and encrypted transmission needs to be performed to ensure data transmission security. The Huawei wallet application notifies the SE to generate a temporary public-private RSA key pair when generating the blank card, and transmit a public key to the server corresponding to the access card through the Huawei wallet application. Therefore, delivery of the second key factor may be encrypted by using the temporary RSA public key. The server corresponding to the access card transmits data that needs to be written into the access card and the second key factor encrypted by using the temporary RSA public key to the Huawei wallet application. The Huawei wallet application delivers the encrypted data to the SE through a secure channel by using the TSM, and writes and stores the encrypted data into the blank card. When receiving the encrypted second key factor, the SE may perform decryption in the blank card by using a previously generated temporary RSA private key, and destroy the generated temporary public and private keys after the decryption is completed.

The second key factor is encrypted by using the temporary RSA public key. In the data backup process, another third-party application such as the Huawei wallet application or a server of the third-party application cannot obtain information about the second key factor. This may improve security of the data backup process.

A process of encrypting and delivering the third key factor is similar to that of the second key factor, and details are not described herein again.

With reference to the first aspect and the foregoing implementations, in some implementations of the first aspect, the first application is a wallet application.

According to a second aspect, a data decryption method is provided. The method is applied to an electronic device, and the electronic device includes a secure element. The method includes: The secure element obtains first data encrypted by using a first backup key, where the first data is data written about a first card when the first card is added to a first application. The secure element receives a first key factor sent by a trusted service manager TSM, where the first key factor is a key factor generated based on user information in the first application. The secure element receives a second key factor sent by a server corresponding to the first card. The secure element determines the first backup key based on the first key factor and the second key factor. The secure element decrypts the first data by using the first backup key, to obtain the first data.

According to the foregoing technical solution, for data written into the SE, in a data decryption process corresponding to the foregoing data encryption process, a content provider (for example, an access card party) of the NFC card is introduced to generate and deliver a key factor (for example, the second key factor). In addition, in combination with another key factor (for example, the first key factor) provided by a mobile phone party (for example, a Huawei device), a real backup key (for example, the first backup key) is generated in the secure element SE of the mobile phone. In a security domain of the SE, sensitive data (for example, the first data) of the card is decrypted by using the first backup key, to obtain the sensitive data. In this process, sensitive data of a user cannot be independently decrypted and restored by the mobile phone party (for example, the Huawei device) or a third party (for example, the access card party), to ensure data security.

Specifically, the data decryption method may be applied to a restoration process after data backup. A process of restoring data of an NFC card written into a Huawei wallet application is used as an example. When a part of sensitive data (for example, the first data) of the card needs to be restored to the SE, a content provider (for example, the access card party) of the NFC card is introduced to generate and deliver a key factor (for example, the second key factor). In other words, the content provider is responsible for security management of the second key factor. In addition, in combination with another key factor (for example, the first key factor) provided by the mobile phone party (for example, the Huawei device), a real backup key (for example, the first backup key) is generated in the secure element SE of the mobile phone. In the security domain of the SE, the sensitive data (for example, the first data) of the card is decrypted by using the first backup key, to obtain the sensitive data of the card. The mobile phone party cannot learn the second key factor delivered by the access card party, and the access card party cannot learn the first key factor generated by the mobile phone party. Neither party can independently determine the first backup key. In other words, the mobile phone party (for example, the Huawei device) or the third party (for example, the access card party) cannot independently decrypt and restore the sensitive data of the user. This implements reliable and secure backup of the data.

With reference to the second aspect and the foregoing implementations, in some implementations of the second aspect, the electronic device further includes a processor, and the processor runs a trusted execution environment TEE. The method further includes: The processor obtains second data encrypted by using a second backup key, where the second data includes data, in the first application, that is about an application system layer of the first card. The processor receives a third key factor sent by a server corresponding to the first application, where the third key factor is a key factor generated based on the user information in the first application. The processor obtains a fourth key factor. The processor determines the second backup key based on the third key factor and the fourth key factor. The processor decrypts the second data by using the second backup key, to obtain the second data.

With reference to the second aspect and the foregoing implementations, in some implementations of the second aspect, the second data further includes the first data encrypted by using the first backup key. After the processor decrypts the second data by using the second backup key, to obtain the second data, the method further includes: The processor sends the first data encrypted by using the first backup key to the secure element. The processor sends the data that is of the application system layer and that is included in the second data to an application system layer of the electronic device.

According to the foregoing technical solution, in a data decryption process that is in the TEE and that corresponds to a data encryption process in the TEE, the content provider (for example, the access card party) of the NFC card is introduced, to generate and deliver a key factor (for example, the fourth key factor). In other words, the content provider is responsible for security management of the fourth key factor. Alternatively, the fourth key factor is randomly generated by the mobile phone party (for example, the Huawei device). In addition, in combination with another key factor (for example, the third key factor) provided by a trusted third party (for example, the Huawei wallet application), a real backup key (for example, the second backup key) is generated in the TEE of the mobile phone. Personalized user data is encrypted in the TEE by using the second backup key and may be uploaded to a cloud for backup. The sensitive data of the user cannot be independently decrypted and restored by the mobile phone party (for example, the Huawei device), the trusted third party (for example, the Huawei wallet application), or a third-party service (for example, the access card party), to ensure data security.

In addition, in the security domain of the SE, the sensitive data (for example, the first data) that is of the card and that is encrypted by using the first backup key may further be combined with personalized user data at an Android system layer to form the second data. After being encrypted again in the TEE, the second data is uploaded to the cloud for backup. This improves security of a data backup process, thereby implementing reliable and secure backup of the data, and improving user experience. Similarly, in the data decryption process, the second data is first decrypted in the TEE by using the second backup key, to obtain a plaintext of the personalized user data at the Android system layer and a ciphertext of the first data encrypted by using the first backup key. In addition, the plaintext of the personalized user data at the Android system layer is transmitted to the Huawei wallet application, and the TEE further delivers the ciphertext of the first data to the SE. The SE decrypts the first data based on the first backup key, to obtain the first data, and stores the first data in the security domain of the SE.

With reference to the second aspect and the foregoing implementations, in some implementations of the second aspect, the fourth key factor is a key factor generated by the server corresponding to the first card and sent to the processor.

With reference to the second aspect and the foregoing implementations, in some implementations of the second aspect, the fourth key factor is a key factor randomly generated by a trusted application TA in the TEE run by the processor. The method further includes: The processor receives the fourth key factor sent by the server corresponding to the first card, where the fourth key factor is encrypted by using the third key factor; or the processor receives the fourth key factor sent by the server corresponding to the first application, where the fourth key factor is encrypted by using the third key factor.

With reference to the second aspect and the foregoing implementations, in some implementations of the second aspect, after the processor receives the fourth key factor sent by the server corresponding to the first card, or the processor receives the fourth key factor sent by the server corresponding to the first application, the method further includes: The processor decrypts the fourth key factor according to a first authentication manner, where the first authentication manner is an authentication manner in which the user enters a password.

With reference to the second aspect and the foregoing implementations, in some implementations of the second aspect, the third key factor received by the processor and sent by the server corresponding to the first application is encrypted by using a public key in a temporary key pair.

With reference to the second aspect and the foregoing implementations, in some implementations of the second aspect, the second key factor received by the secure element and sent by the server corresponding to the first card is encrypted by the TSM by using the public key in the temporary key pair.

With reference to the second aspect and the foregoing implementations, in some implementations of the second aspect, the first application is a wallet application.

According to a third aspect, a data encryption method is provided. The method is applied to an electronic device, the electronic device includes a processor, and the processor runs a trusted execution environment TEE. The method includes: The processor obtains second data, where the second data includes data, in a first application, that is about an application system layer of a first card. The processor receives a third key factor sent by a server corresponding to the first application, where the third key factor is a key factor generated based on user information in the first application. The processor obtains a fourth key factor. The processor generates a second backup key based on the third key factor and the fourth key factor. The processor encrypts the second data by using the second backup key.

With reference to the third aspect, in some implementations of the third aspect, the fourth key factor is a key factor generated by a server corresponding to the first card and sent to the processor.

With reference to the third aspect and the foregoing implementations, in some implementations of the third aspect, the fourth key factor is a key factor randomly generated by a trusted application TA in the TEE run by the processor. The method further includes: The processor sends the fourth key factor to the server corresponding to the first card, where the fourth key factor is encrypted by using the third key factor; or the processor sends the fourth key factor to the server corresponding to the first application, where the fourth key factor is encrypted by using the third key factor.

With reference to the third aspect and the foregoing implementations, in some implementations of the third aspect, before the processor sends the fourth key factor to the server corresponding to the first card, or the processor sends the fourth key factor to the server corresponding to the first application, the method further includes: The processor encrypts the fourth key factor according to a first authentication manner, where the first authentication manner is an authentication manner in which a user enters a password.

With reference to the third aspect and the foregoing implementations, in some implementations of the third aspect, the third key factor received by the processor and sent by the server corresponding to the first application is encrypted by using a public key in a temporary key pair.

With reference to the third aspect and the foregoing implementations, in some implementations of the third aspect, the first application is a wallet application.

According to a fourth aspect, a data decryption method is provided. The method is applied to an electronic device, the electronic device includes a processor, and the processor runs a trusted execution environment TEE. The method includes: The processor obtains second data encrypted by using a second backup key, where the second data includes data, in a first application, that is about an application system layer of a first card. The processor receives a third key factor sent by a server corresponding to the first application, where the third key factor is a key factor generated based on user information in the first application. The processor obtains a fourth key factor. The processor determines the second backup key based on the third key factor and the fourth key factor. The processor decrypts the second data by using the second backup key, to obtain the second data.

With reference to the fourth aspect, in some implementations of the fourth aspect, the fourth key factor is a key factor generated by a server corresponding to the first card and sent to the processor.

With reference to the fourth aspect and the foregoing implementations, in some implementations of the fourth aspect, the fourth key factor is a key factor randomly generated by a trusted application TA in the TEE run by the processor. The method further includes: The processor receives the fourth key factor sent by the server corresponding to the first card, where the fourth key factor is encrypted by using the third key factor; or the processor receives the fourth key factor sent by the server corresponding to the first application, where the fourth key factor is encrypted by using the third key factor.

With reference to the fourth aspect and the foregoing implementations, in some implementations of the fourth aspect, after the processor receives the fourth key factor sent by the server corresponding to the first card, or the processor receives the fourth key factor sent by the server corresponding to the first application, the method further includes: The processor decrypts the fourth key factor according to a first authentication manner, where the first authentication manner is an authentication manner in which a user enters a password.

With reference to the fourth aspect and the foregoing implementations, in some implementations of the fourth aspect, the third key factor received by the processor and sent by the server corresponding to the first application is encrypted by using a public key in a temporary key pair.

With reference to the fourth aspect and the foregoing implementations, in some implementations of the fourth aspect, the first application is a wallet application.

According to a fifth aspect, a secure element is provided, including an obtaining unit, configured to obtain first data. The first data is data that is about a first card and that is written into the secure element when the first card is added to a first application. The obtaining unit is further configured to receive a first key factor sent by a trusted service manager TSM. The first key factor is a key factor generated by the TSM based on user information in the first application. The obtaining unit is further configured to receive a second key factor sent by a server corresponding to the first card. The second key factor is a key factor generated by the server corresponding to the first card. The secure element further includes a processing unit, configured to generate a first backup key based on the first key factor and the second key factor. The processing unit is further configured to encrypt the first data by using the first backup key.

With reference to the fifth aspect, in some implementations of the fifth aspect, the secure element further includes a sending unit, configured to upload the encrypted first data to a cloud server for backup.

With reference to the fifth aspect and the foregoing implementations, in some implementations of the fifth aspect, the second key factor received by the secure element and sent by the server corresponding to the first card is encrypted by the TSM by using a public key in a temporary key pair.

According to a sixth aspect, a secure element is provided, including an obtaining unit, configured to obtain first data encrypted by using a first backup key. The first data is data that is about a first card and that is written into the secure element when the first card is added to a first application. The obtaining unit is further configured to receive a first key factor sent by a trusted service manager TSM. The first key factor is a key factor generated based on user information in the first application. The obtaining unit is further configured to receive a second key factor sent by a server corresponding to the first card. The secure element further includes a processing unit, configured to determine the first backup key based on the first key factor and the second key factor. The processing unit is further configured to decrypt the first data by using the first backup key, to obtain the first data.

With reference to the sixth aspect, in some implementations of the sixth aspect, the second key factor received by the secure element and sent by the server corresponding to the first card is encrypted by the TSM by using a public key in a temporary key pair.

According to a seventh aspect, a processor is provided, and the processor runs a trusted execution environment TEE. The processor includes an obtaining unit, configured to obtain second data. The second data includes data, in a first application, that is about an application system layer of a first card. The obtaining unit is further configured to receive a third key factor sent by a server corresponding to the first application. The third key factor is a key factor generated based on user information in the first application. The obtaining unit is further configured to obtain a fourth key factor. The processor further includes a processing unit, configured to generate a second backup key based on the third key factor and the fourth key factor. The processing unit is further configured to encrypt the second data by using the second backup key.

With reference to the seventh aspect, in some implementations of the seventh aspect, the fourth key factor is a key factor generated by a server corresponding to the first card and sent to the processor.

With reference to the seventh aspect and the foregoing implementations, in some implementations of the seventh aspect, the fourth key factor is a key factor randomly generated by a trusted application TA in the TEE run by the processor. The processor further includes a sending unit, configured to: send the fourth key factor to the server corresponding to the first card, where the fourth key factor is encrypted by using the third key factor; or send the fourth key factor to the server corresponding to the first application, where the fourth key factor is encrypted by using the third key factor.

With reference to the seventh aspect and the foregoing implementations, in some implementations of the seventh aspect, before the sending unit of the processor sends the fourth key factor to the server corresponding to the first card, or sends the fourth key factor to the server corresponding to the first application, the processing unit is further configured to encrypt the fourth key factor according to a first authentication manner, where the first authentication manner is an authentication manner in which a user enters a password.

With reference to the seventh aspect and the foregoing implementations, in some implementations of the seventh aspect, the third key factor received by the processor and sent by the server corresponding to the first application is encrypted by using a public key in a temporary key pair.

With reference to the seventh aspect and the foregoing implementations, in some implementations of the seventh aspect, the first application is a wallet application.

According to an eighth aspect, a processor is provided, and the processor runs a trusted execution environment TEE. The processor includes an obtaining unit, configured to obtain second data encrypted by using a second backup key. The second data includes data, in a first application, that is about an application system layer of a first card. The obtaining unit is further configured to obtain a third key factor sent by a server corresponding to the first application. The third key factor is a key factor generated based on user information in the first application. The obtaining unit is further configured to obtain a fourth key factor. The processor further includes a processing unit, configured to determine the second backup key based on the third key factor and the fourth key factor. The processing unit is further configured to decrypt the second data by using the second backup key, to obtain the second data.

With reference to the eighth aspect and the foregoing implementations, in some implementations of the eighth aspect, the fourth key factor is a key factor generated by a server corresponding to the first card and sent to the processor.

With reference to the eighth aspect and the foregoing implementations, in some implementations of the eighth aspect, the fourth key factor is a key factor randomly generated by a trusted application TA in the TEE run by the processor. The obtaining unit is further configured to: obtain the fourth key factor sent by the server corresponding to the first card, where the fourth key factor is encrypted by using the third key factor; or obtain the fourth key factor sent by the server corresponding to the first application, where the fourth key factor is encrypted by using the third key factor.

With reference to the eighth aspect and the foregoing implementations, in some implementations of the eighth aspect, after the obtaining unit of the processor obtains the fourth key factor sent by the server corresponding to the first card, or obtains the fourth key factor sent by the server corresponding to the first application, the processing unit is further configured to decrypt the fourth key factor according to a first authentication manner, where the first authentication manner is an authentication manner in which a user enters a password.

With reference to the eighth aspect and the foregoing implementations, in some implementations of the eighth aspect, the third key factor obtained by the processor and sent by the server corresponding to the first application is encrypted by using a public key in a temporary key pair.

With reference to the eighth aspect and the foregoing implementations, in some implementations of the eighth aspect, the first application is a wallet application.

According to a ninth aspect, an electronic device is provided, including a system layer, where the system layer runs a first application; the secure element according to any one of the fifth aspect and the implementations of the fifth aspect or any one of the sixth aspect and the implementations of the sixth aspect; and the processor according to any one of the seventh aspect and the implementations of the seventh aspect or any one of the eighth aspect and the implementations of the eighth aspect. The system layer, the secure element, and the processor cooperate with each other, so that the electronic device is enabled to perform the method according to any one of the first aspect and the implementations of the first aspect, the second aspect and the implementations of the second aspect, the third aspect and the implementations of the third aspect, and the fourth aspect and the implementations of the fourth aspect.

With reference to the ninth aspect, in some implementations of the ninth aspect, the first application is a wallet application.

According to a tenth aspect, an electronic device is provided, including one or more processors, one or more memories, a plurality of applications, and one or more programs. The one or more programs are stored in the memory, and when the one or more programs are executed by the processor, the electronic device is enabled to perform the method according to any one of the first aspect and the implementations of the first aspect, the second aspect and the implementations of the second aspect, the third aspect and the implementations of the third aspect, and the fourth aspect and the implementations of the fourth aspect.

According to an eleventh aspect, an apparatus is provided. The apparatus is included in an electronic device, and the apparatus has a function of implementing behavior of the electronic device in the foregoing aspects and the possible implementations of the foregoing aspects. The function may be implemented by hardware, or may be implemented by hardware by executing corresponding software. The hardware or the software includes one or more modules or units corresponding to the foregoing function, for example, a display module or unit, a detection module or unit, or a processing module or unit.

According to a twelfth aspect, a secure element is provided, including a processor and an interface. The processor and the interface cooperate with each other, so that the secure element is enabled to perform the method according to any one of the first aspect and the implementations of the first aspect and the second aspect and the implementations of the second aspect.

According to a thirteenth aspect, this application provides an electronic device, including a touch display. The touch display includes a touch-sensitive surface, a display, a camera, one or more processors, a memory, a plurality of applications, and one or more computer programs. The one or more computer programs are stored in the memory, and the one or more computer programs include instructions. When the instructions are executed by the electronic device, the electronic device is enabled to perform any possible method according to any one of the foregoing aspects.

According to a fourteenth aspect, this application provides an electronic device, including one or more processors and one or more memories. The one or more memories are coupled to the one or more processors. The one or more memories are configured to store computer program code, and the computer program code includes computer instructions. When the one or more processors execute the computer instructions, the electronic device is enabled to perform the method according to any one of the first aspect and the implementations of the first aspect, the second aspect and the implementations of the second aspect, the third aspect and the implementations of the third aspect, and the fourth aspect and the implementations of the fourth aspect.

According to a fifteenth aspect, this application provides a computer storage medium, including computer instructions. When the computer instructions are run on an electronic device, the electronic device is enabled to perform the possible method according to any one of the first aspect and the implementations of the first aspect, the second aspect and the implementations of the second aspect, the third aspect and the implementations of the third aspect, and the fourth aspect and the implementations of the fourth aspect.

According to a sixteenth aspect, this application provides a computer program product. When the computer program product runs on an electronic device, the electronic device is enabled to perform the possible method according to any one of the first aspect and the implementations of the first aspect, the second aspect and the implementations of the second aspect, the third aspect and the implementations of the third aspect, and the fourth aspect and the implementations of the fourth aspect.

DESCRIPTION OF EMBODIMENTS

The following describes the technical solutions in the embodiments of this application with reference to the accompanying drawings in the embodiments of this application.

In the descriptions of the embodiments of this application, the terms "first" and "second" are merely intended for description, and shall not be understood as an indication or implication of relative importance or implicit indication of a quantity of indicated technical features. Therefore, a feature limited by "first" or "second" may explicitly or implicitly include one or more features. In the descriptions of the embodiments, unless otherwise specified, "a plurality of" means two or more than two.

Figure 1:
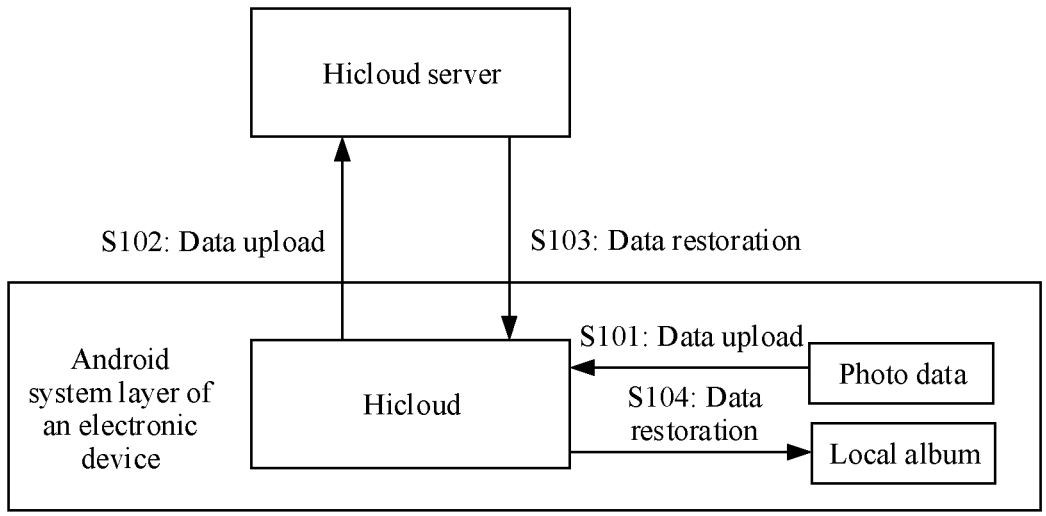
FIG. 1 is a schematic diagram of a data backup process.

As described in the background, in an existing data backup process, data at an application layer is mainly backed up. To be specific, personalized user data at an Android system layer, for example, data such as a photo stored in an album, is backed up. FIG. 1 is a schematic diagram of a data backup process. For example, data of an electronic device is stored by using a Hicloud (Hicloud). When a user starts backup, the user first obtains a permission for data that can be backed up, to determine the data that can be backed up, for example, photo data. In a process of backing up the photo data, the following steps may be performed:

S101: The user starts a photo backup process, and the Hicloud reads a local photo.

S102: The Hicloud uploads the read local photo to the Hicloud, and stores the photo.

S103: The user starts a data restoration process, and the Hicloud obtains photo data from a Hicloud server side.

S104: The Hicloud stores the obtained photo data in a local album of the electronic device.

It should be understood that, in the foregoing existing data backup process, only the data (for example, album data) at the application layer is backed up by using the Hicloud (for example, Hicloud) at the Android system layer.

For a trusted third-party application such as a Huawei wallet application, different types of card information written into the Huawei wallet application include the personalized user data at the Android system layer, and further include personal privacy data or sensitive data of the user that is written and stored in a trusted execution environment (trusted execution environment, TEE) and a secure element (secure element). The personal privacy data or the sensitive data of the user needs to be stored in a security domain of the SE. The data relates to the card information, and therefore has a relatively high security requirement.

For example, an access card is used as an example. When the access card is written into the Huawei wallet application, serial number data of the access card is written and stored in the SE, and data such as user name information and a profile picture of the user is the personalized user data at the Android system layer.

A bank card is also used as an example. Data such as a serial number of the bank card, user interaction data (transaction content and a transaction amount) of the user in a financial transaction, a credential for logging in to an enterprise virtual private network (virtual private network, VPN), a personal identification number (personal identification number, PIN) entered by the user, or a key resource in a near field communication (near field communication, NFC) mobile payment service process of the user is written and stored in the SE. Data such as user name information and a profile picture of the user is the personalized user data at the Android system layer.

An existing solution provides no backup method for the foregoing personal privacy data or sensitive data of the user that is written and stored in the SE or the TEE. In other words, currently, secure data backup based on the TEE and the SE is basically in a vacuum state, and there is no data backup method that can implement secure data backup based on the SE and the TEE.

Therefore, a data backup method is required, to securely back up personal data of the user to a cloud, and prevent a cloud service provider (a mobile phone manufacturer) from decrypting the backup data of the user, so as to ensure data backup security. This application provides a secure data backup method, to implement secure data backup and secure data restoration based on the SE and the TEE, so that neither the mobile phone manufacturer nor a card provider can independently decrypt the backup data of the user. This ensures security of the personal privacy data or the sensitive data of the user stored in the SE and the TEE.

Data encryption, data decryption, secure data backup, secure data restoration methods provided in the embodiments of this application may be applied to an electronic device, or may be separate application programs. The application programs may implement processes of data encryption, data decryption, secure data backup, and secure data restoration. For example, the electronic device may be an electronic device such as a mobile phone, a tablet computer, a wearable device, a vehicle-mounted device, an augmented reality (augmented reality, AR)/virtual reality (virtual reality, VR) device, a notebook computer, an ultra-mobile personal computer (ultra-mobile personal computer, UMPC), a netbook, or a personal digital assistant (personal digital assistant, PDA). A specific type of the electronic device is not limited in the embodiments of this application.

Specifically, a path may be opened in the Huawei wallet application of the electronic device, to write an NFC card into the Huawei wallet application. For example, another card is added to the Huawei wallet application, and the card is a bank card, a bus card, an access card, an identity card, a fitness membership card, a shopping mall membership card, a smart staff card, a student card, or another NFC card. In a process of backing up various types of card data, the secure element SE and the trusted execution environment TEE are used to separately implement secure backup of different types of data packets in the card data. In the backup process, the user and a third-party card data provider are introduced, and are separately responsible for generation, storage, and delivery of one of key factors. Then, in combination with a key factor provided by a mobile phone party, a real backup key is generated to encrypt the data. After being encrypted in the SE and TEE, the card data is uploaded to a cloud server for backup. In this data backup method, a plurality of parties are involved, so that any party cannot independently decrypt user data. For example, backup data of the user cannot be independently decrypted by the mobile phone party, the third-party card data provider, or a trusted third party including the Huawei wallet application. This ensures data backup security in the SE and the TEE.

It should be understood that this application relates to data backup and data restoration. The data backup refers to uploading data of an electronic device 1 to the cloud server. For example, card information in the Huawei wallet application is uploaded by using the Hicloud to a Hicloud server for backup. The data restoration refers to downloading and restoring data backed up on the cloud server to an electronic device 2. For example, the card information, in the Huawei wallet application, that is backed up on the Hicloud server is downloaded to a local folder of the Huawei wallet application. The electronic device 1 and the electronic device 2 may be one electronic device, or may be different electronic devices. This is not limited in this application.

It should be further understood that a card for backup in this application may be a card supporting near field communication (near field communication, NFC), for example, an NFC card such as an access card, a bank card, a bus card, an identity card, a fitness membership card, a shopping mall membership card, a smart staff card, or a student card. The card may be in a form of a common physical card or in a form of an electronic card. Alternatively, the card may be account information, a user permission, and the like added to the Huawei wallet application, or a card that is in another form and can be read and added to the Huawei wallet application. This is not limited in this application.

Figure 2:
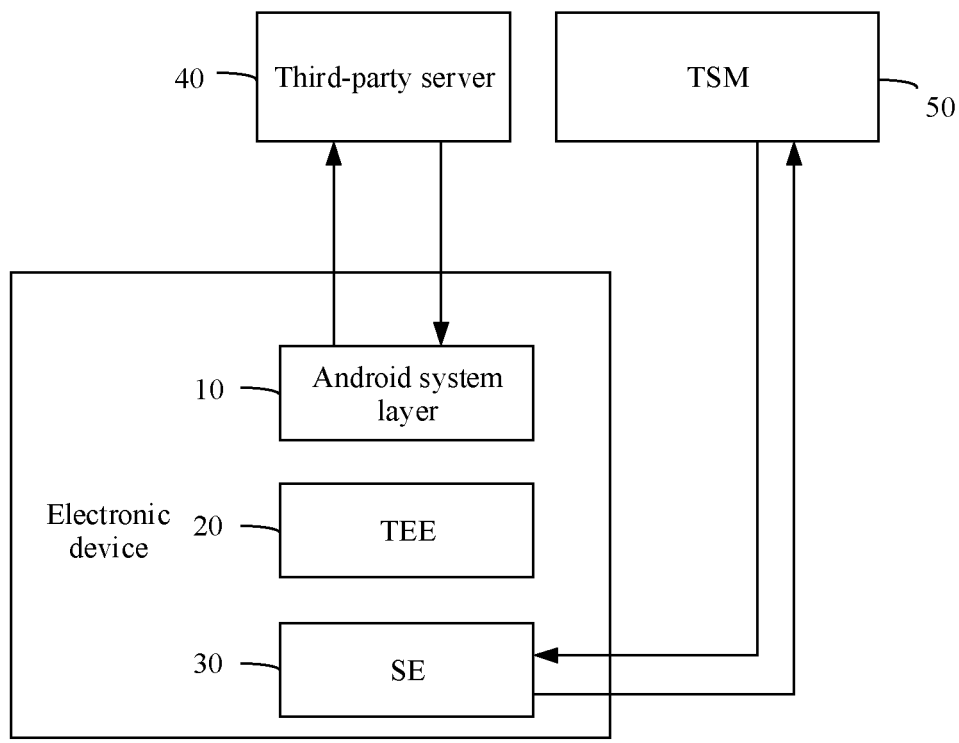
FIG. 2 is a schematic diagram of a system architecture according to an embodiment of this application.
Figure 3A:
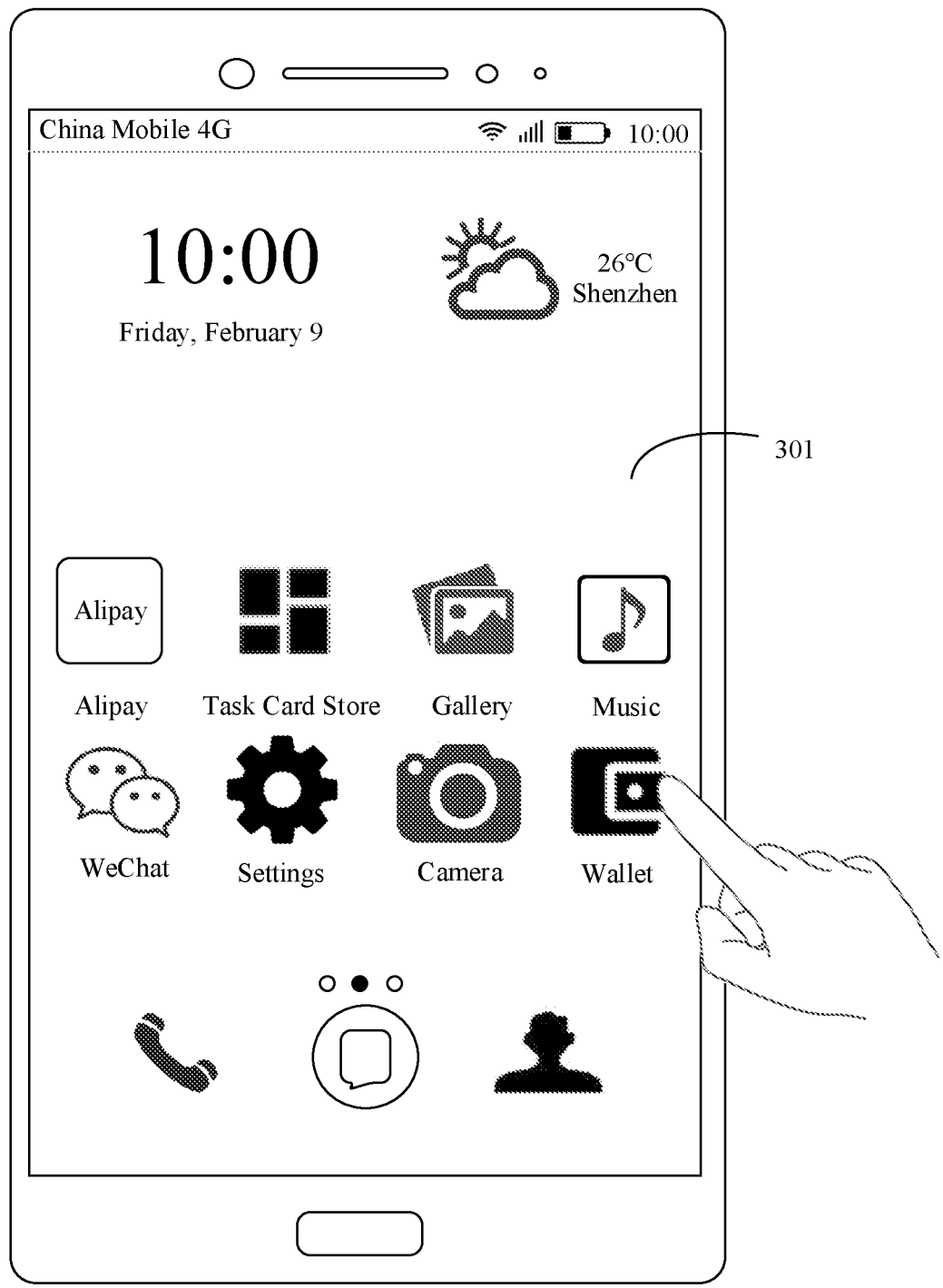
FIG. 3(a) to FIG. 3(d) are a schematic diagram of a graphical user interface in a data backup process according to an embodiment of this application.
Figure 3B:
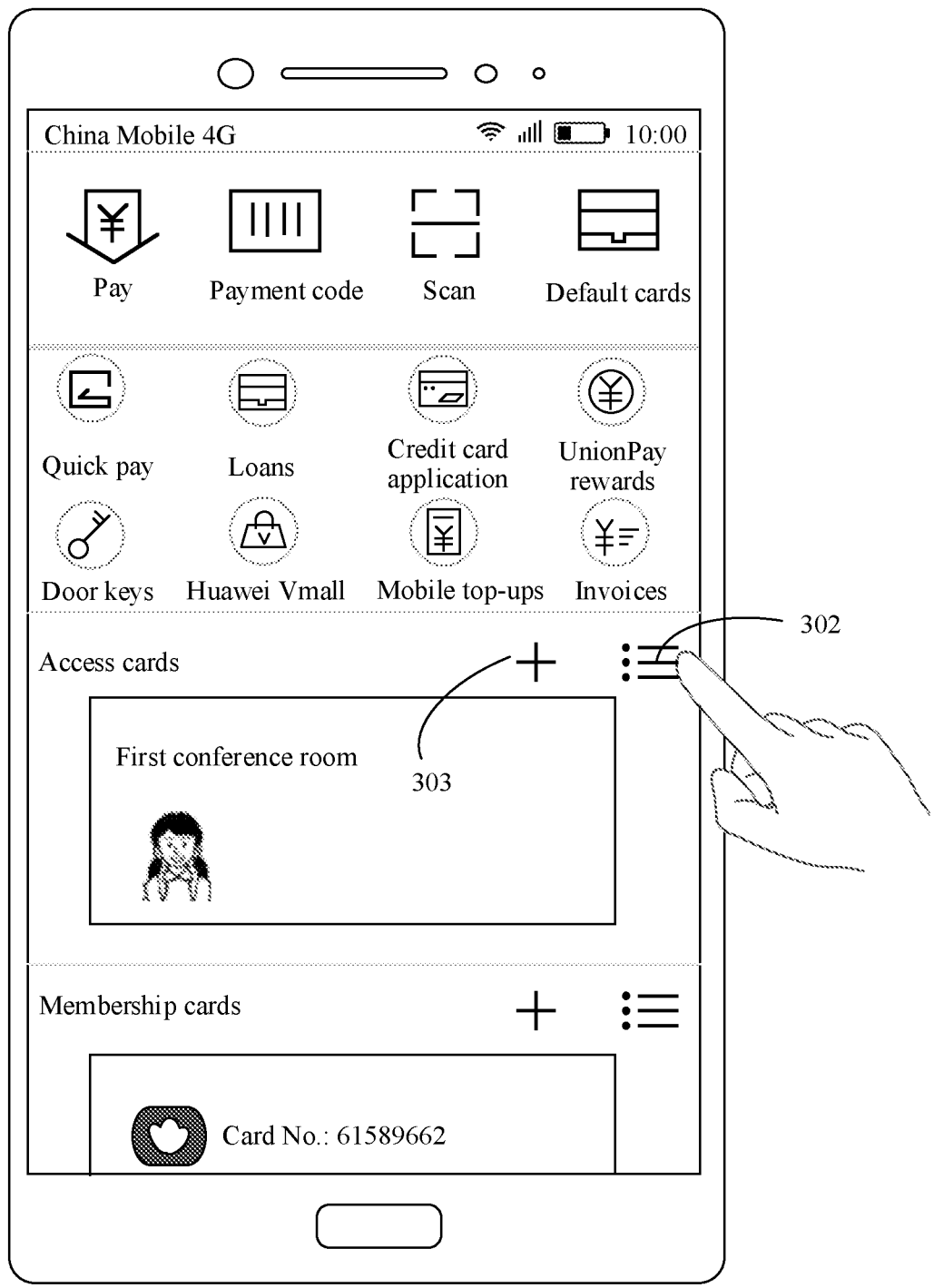
Figure 3C:
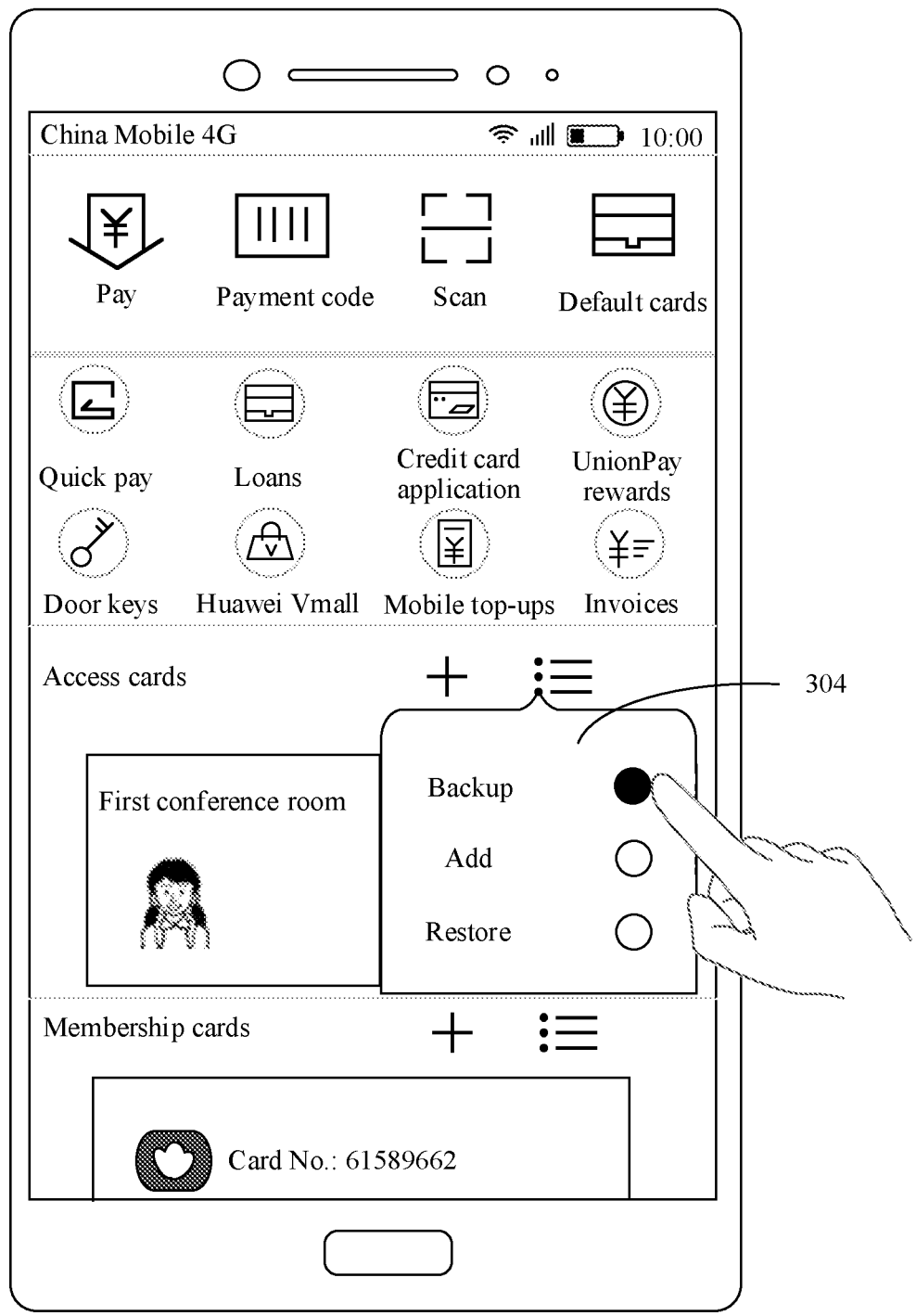
Figure 3D:
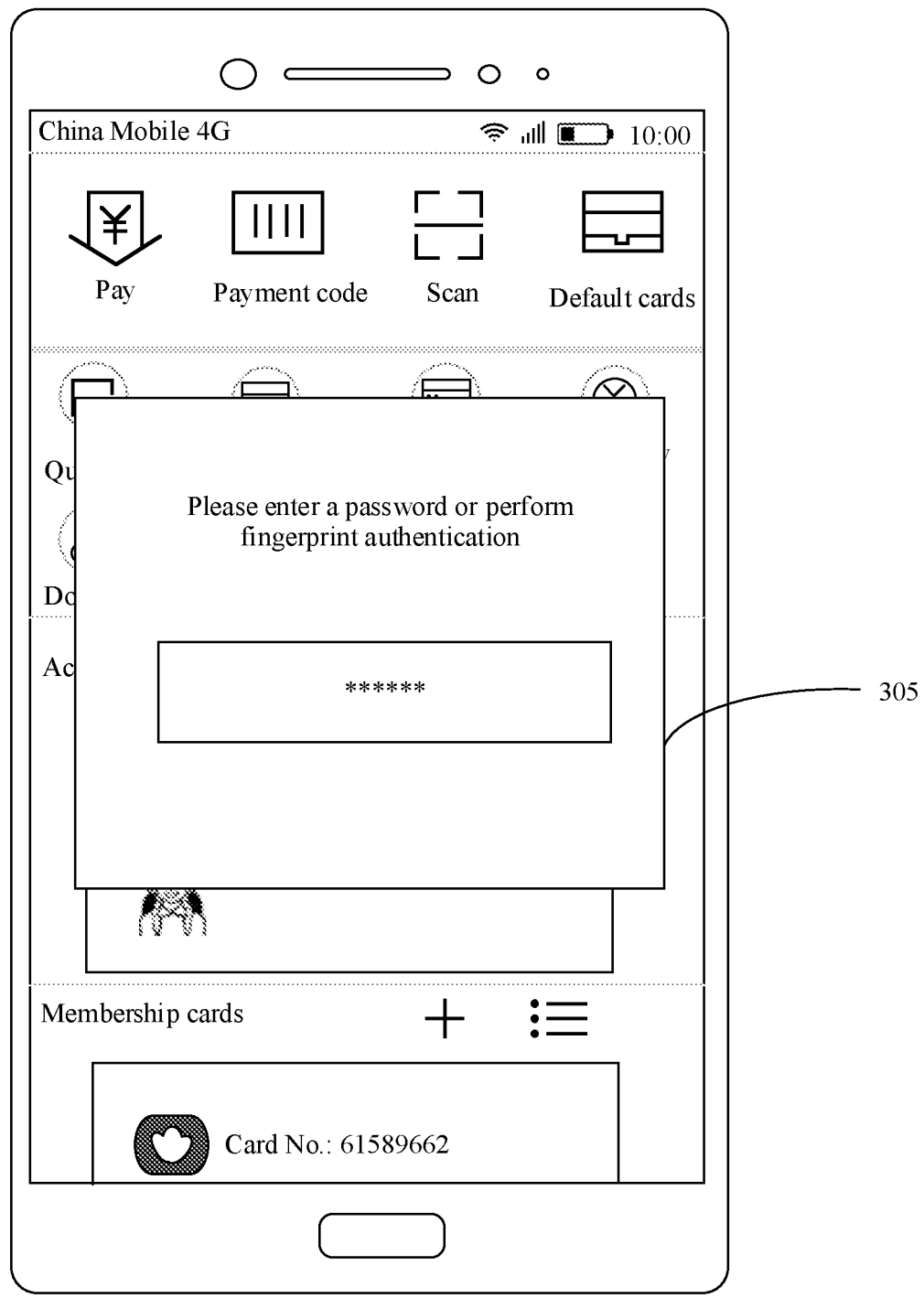

FIG. 2 is a schematic diagram of a system architecture according to an embodiment of this application. The secure data backup method provided in this application may be applied to a system 200. The system 200 includes an Android system layer 10, a TEE 20, and an SE 30 that are provided by an electronic device, a third-party server 40, and a trusted service manager TSM (Trusted Service Manager, TSM) 50. The following briefly describes components, modules, and concepts related to the system architecture 200.

1. Android System Layer 10

The Android system layer 10 provides a rich execution environment (rich execution environment, REE) for the electronic device, that is, provides a running environment for various applications of the electronic device, for example, applications such as the Hicloud (Hicloud) and the Huawei wallet application (wallet application, wallet app) that are listed in this application.

2. Trusted Execution Environment TEE 20

A TEE is a concept proposed by the global platform (global platform, GP). The TEE is a running environment that coexists with an Android system layer, a rich operating system (rich operating system, rich OS), or the like on a device, and provides a security service for the Android system layer or the rich OS. The TEE has separate execution space and has a higher security level than the Android system layer or the rich OS. In this application, the Android system layer, the TEE, and the SE are used as an example for description.

The TEE is a framework running on the electronic device, and provides security that is between security provided by the Android system layer and security provided by the SE. For example, for data about some small payments, an enterprise virtual private network (virtual private network, VPN), or the like, strength of required security protection is not high, and a separate SE is not required for protection. In addition, the data cannot be directly placed at the Android system layer, to prevent an attack due to openness of the Android system layer. Therefore, the TEE may be used to provide security protection for such applications.

In addition, the TEE provides a secure execution environment for a trusted application (trusted application, TA), and also protects confidentiality and integrity of and an access permission to a resource and data of the TA. In the TEE, all TAs are mutually independent and cannot access each other without authorization.

3. Secure Element SE 30

An SE is a secure element built into the electronic device, and the secure element can enhance a security level of the electronic device. In a data backup process, the SE can create a security domain. Data in the security domain may be encrypted and then uploaded to an application layer for backup, to improve data security in the backup process.

4. Trusted Service Manager TSM (Trusted Service Manager, TSM) 50

The system 200 further includes the TSM 50. The TSM 50 may be configured to exclusively manage a writing process of the SE, deliver a key factor to the SE, and the like. For example, when the user writes an access card into the Huawei wallet application for the first time, in a process of reading the access card by the Huawei wallet application, the TSM may create a security domain (security domain) in the SE, and write information about the access card (for example, a serial number of the access card) into the security domain.

A TSM platform has two main functions: application release management and security module management. The TSM platform may support access of a plurality of service platforms, provide a secure card issuing channel for a service provider, and manage an application and a security domain. The TSM platform is not only a platform for a mobile network operator or a financial institution, but also a platform that can remotely issue smart cards in various industries to the user and manage a cooperation relationship. The TSM platform may be applied to any industry and region that require smart cards.

The TSM platform is a core of a near field communication (near field communication, NFC) mobile payment service. Based on security carrier-based smart card application issuing and management services provided by the TSM for each party, the user can discover and download various card applications such as a bank card, an access card, a bus card, a membership card, and a coupon on a mobile phone, pay by swiping the mobile phone anytime and anywhere, and enjoy safe and convenient mobile payment services. In this application, the TSM may exclusively manage the writing process of the SE. A specific process is described in detail in this embodiment.

The system 200 further includes a third-party server 20. Different applications correspond to different servers, and the servers are collectively referred to as third-party servers herein, such as a Hicloud server (Hicloud server), a wallet server (wallet server), a server corresponding to the access card, and a server corresponding to the bank card. A quantity and a type of the third-party servers are not limited in this application.

The foregoing describes related elements or implementation environments in the secure data backup method provided in this application. It should be understood that, in an implementation process of the secure data backup method provided in this application, some or all of the foregoing components and modules may be included. In descriptions of subsequent embodiments, the secure data backup method provided in this application is described by using an example in which the mobile phone is used as the electronic device and the access card in the Huawei wallet application is backed up. This is not limited in this application.

FIG. 3(*a*) to FIG. 3(*d*) are schematic diagrams of a graphical user interface (graphical user interface, GUI) in a data backup process according to an embodiment of this application. In this application, a mobile phone is used as an electronic device to describe in detail the secure data backup method provided in this application. FIG. 3(*a*) shows currently output interface content 301 that is displayed by a screen display system of the mobile phone in an unlocking mode of the mobile phone. The interface content 301 is a home screen of the mobile phone. The interface content 301 displays a plurality of third-party applications (application, App), such as Alipay, Task Card Store, Gallery, WeChat, Wallet, Camera, and Settings. It should be understood that the interface content 301 may further include more applications. This is not limited in this application.

A user performs a tap operation shown in FIG. 3(*a*) on the wallet application. In response to the tap operation, the mobile phone enters a home interface 302 of the wallet shown in FIG. 3(*b*). The home interface 302 of the wallet includes a plurality of menu options, such as card swiping, payment code, scanning, default card setting, quick pay, loans, credit card application, door keys, Huawei Vmall, mobile top-ups, and invoices. In addition, the home interface 302 further includes a list of a plurality of cards added by the user to the wallet, for example, an access card, a membership card, a bank card, and a traffic card. A type and a quantity of cards added by the user are not limited in this application.

It can be learned from FIG. 3(*b*) that each card on the home interface 302 includes an adding control 303 configured to increase a quantity of cards and a control 302 configured to perform a card operation. The user performs a tap operation in FIG. 3(*b*) on the control 302 that performs the card operation. In response to the tap operation, the mobile phone displays an interface shown in FIG. 3(*c*). The interface includes a window 304. The window 304 includes options "backup", "add", and "restore". The user may perform operations such as management on the card by tapping any option. For example, for an access card of a first conference room, the user performs an operation of tapping a backup option in FIG. 3(*c*). In response to a backup command of the user, the mobile phone backs up data of the access card of the first conference room.

Optionally, before starting data backup of the access card, the mobile phone may pop up an authentication window 305 shown in FIG. 3(*d*). The authentication window may display "Please enter a password or perform fingerprint authentication". The user may enter a digital password or set another biometric authentication manner, to perform security authentication on the operation of backing up the access card, so as to improve data backup security. This is not limited in this application. It should be further understood that, in this application, secure backup of the card data in the wallet may be started by using the method described in FIG. 3(*a*) to FIG. 3(*d*), or data backup may be started in the setting application on the home screen 301 of the mobile phone. This is not limited in this application. The following describes in detail a specific process of backing up the card data in the wallet.

In a possible implementation, in a secure element SE, the secure element obtains first data, where the first data is data written about a first card when the first card is added to a first application. The secure element receives a first key factor sent by a trusted service manager TSM, where the first key factor is a key factor generated based on user information in the first application. The secure element receives a second key factor sent by a server corresponding to the first card. The secure element generates a first backup key based on the first key factor and the second key factor. The secure element encrypts the first data by using the first backup key.

It should be understood that the card for backup in this application may be a card supporting near field communication (near field communication, NFC), for example, an access card, a bank card, a bus card, or a credit card. This is not limited in this application.

It should be further understood that the first data is data written into the secure element SE in this application. In a process of writing card information into a Huawei wallet application, a part of data needs to be stored in a security domain of the SE. This part of data relates to the card information, and therefore has a relatively high security requirement. In this embodiment of this application, the part of data stored in the security domain of the SE is referred to as the "first data".

For example, the access card is used as an example. The first data may include a serial number of the access card. When the access card is written into the Huawei wallet application, the TSM may create the security domain (security domain) in the SE, and write the serial number of the access card into the security domain. In other words, the serial number of the access card is stored in the SE.

For another example, the bank card is used as an example. The first data may include a serial number of the bank card, transaction content and a transaction amount of the user, a key resource in a mobile payment service process, or the like. The foregoing data is written and stored in the security domain of the SE.

It should be further understood that, when the secure data backup method provided in the embodiments of this application is used, it is required that a card type of a to-be-backed-up card may support backup, a card issuer allows backup, and the user allows the card to be backed up to a cloud. For example, an access card party allows data of the access card to be backed up. However, for an electronic identification card (electronic identification card, eID) of the user, backup of eID data is not allowed. Alternatively, for example, if some manufacturers do not want to back up the access card, the access card may be set when a blank card service is applied for. However, in a backup process, the user agrees to back up the access card to a cloud server.

Figure 4:
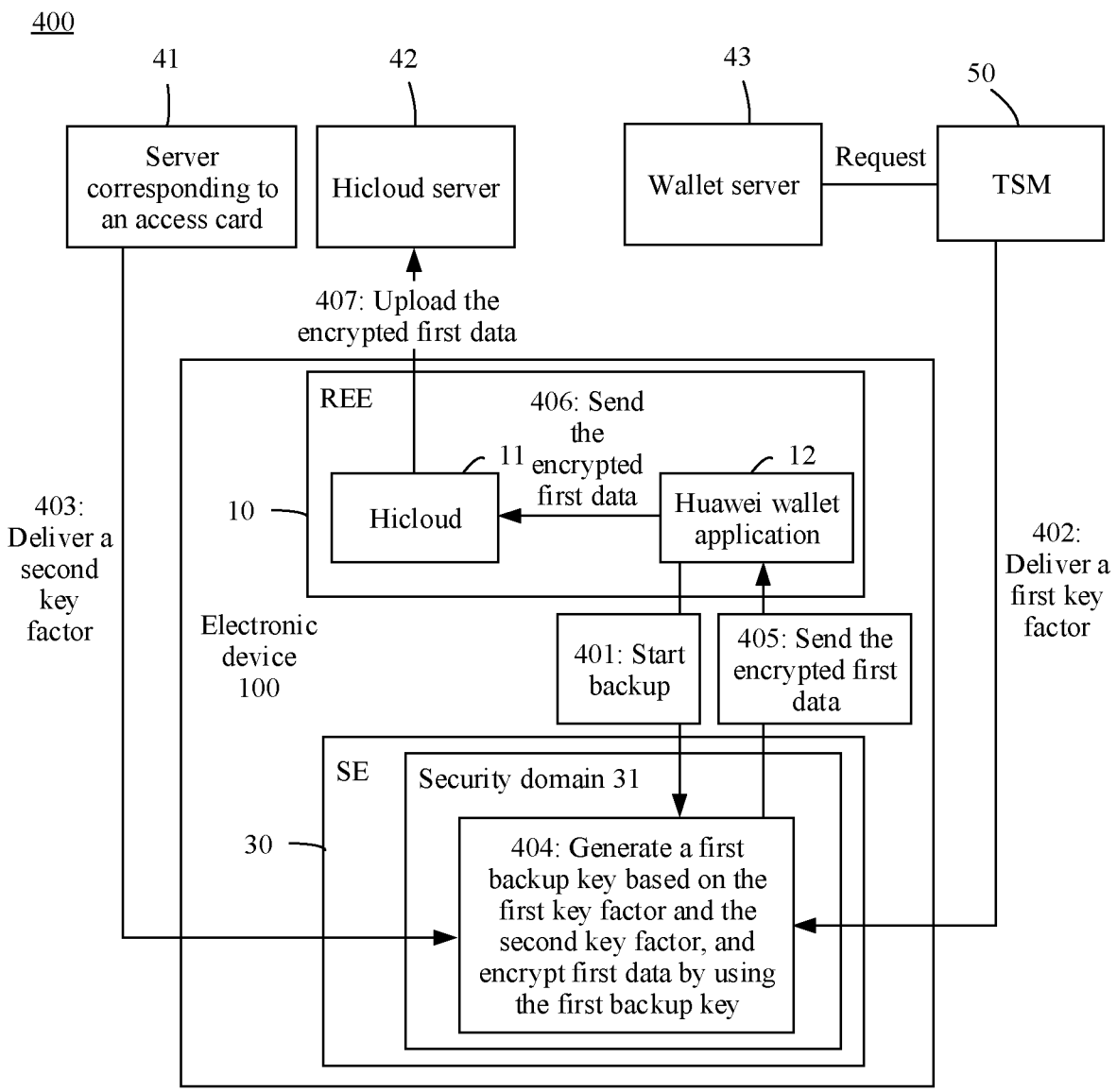
FIG. 4 is a schematic diagram of an implementation process of a secure data backup method according to an embodiment of this application.

FIG. 4 is a schematic diagram of an implementation process of a secure data backup method according to an embodiment of this application. A data backup process of an access card in a Huawei wallet application is used as an example. For first data stored in a security domain of an SE, a backup process may be shown in FIG. 4. The process includes the following content.

401: A user starts the data backup process.

It should be understood that step 401 in FIG. 4 shows that the user may start the data backup process by performing an operation in the Huawei wallet application 12 by using the method shown in FIG. 3(*a*) to FIG. 3(*d*). Optionally, the user may directly start the backup process in a setting application, to back up all user data. This is not limited in this application.

402: A TSM 50 delivers a first key factor to the SE 30, and stores the first key factor in the security domain of the SE.

Specifically, the TSM 50 may manage a writing process of the SE 30. When the user writes information about the access card into the Huawei wallet application 12, the Huawei wallet application 12 sends a request to a wallet server 43 through a communications interface of the mobile phone, to request the wallet server 43 to contact the TSM 50. The Huawei wallet application generates a blank key card in the SE 30 through the TSM 50. In addition, the TSM 50 creates a security domain 31 in the SE 30, delivers the first key factor, and stores the first key factor in the security domain 31.

It should be understood that interaction between the TSM and the SE complies with a regulation of an international standard organization, namely, the global platform (global platform, GP), to ensure process data security. When delivering the blank card, the TSM generates and delivers the first key factor of the access card. At the same time, the Huawei wallet application notifies the SE to generate a temporary RSA (Rivest Shamir Adleman, RSA) key pair when generating the blank card, and transmit a public key to a server 41 corresponding to the access card through the Huawei wallet application.

It should be understood that the first key factor is delivered through a fixed secure channel of the TSM. Therefore, the first key factor is delivered in a form of plaintext data, and this can meet a security requirement.

403: The server 41 corresponding to the access card delivers a second key factor to the SE 30, and stores the second key factor in the security domain 31 of the SE.

Specifically, when the access card is written into the Huawei wallet application 12, the server 41 corresponding to the access card needs to be notified. The server 41 corresponding to the access card delivers the second key factor to the SE 30, and stores the second key factor in the security domain 31.

In a possible implementation, the server 41 corresponding to the access card may request, through the Huawei wallet application 12, the wallet server 43 to deliver the second key factor through the TSM 50. Therefore, although the second key factor shown in FIG. 4 is delivered by the server 41 of the access card to the SE 30, actually, the second key factor may alternatively be delivered by the TSM 50 to the SE 30. This is not limited in this application.

In addition, it should be understood that, in a process of delivering the second key factor, interaction between a plurality of servers is involved, and encrypted transmission needs to be performed to ensure data transmission security. The Huawei wallet application notifies the SE to generate the temporary public-private RSA key pair when generating the blank card, and transmit the public key to the server 41 corresponding to the access card through the Huawei wallet application. Therefore, delivery of the second key factor may be encrypted by using the temporary RSA public key. The server 41 corresponding to the access card transmits data that needs to be written into the access card and the second key factor encrypted by using the temporary RSA public key to the Huawei wallet application 12. The Huawei wallet application 12 delivers the encrypted data to the SE through a secure channel by using the TSM, and writes and stores the encrypted data into the blank card.

When receiving the encrypted second key factor, the SE 30 may perform decryption in the blank card by using a previously generated temporary RSA private key, and destroy the generated temporary public and private keys after the decryption is completed.

The second key factor is encrypted by using the temporary RSA public key. In the data backup process, another third-party application such as the Huawei wallet application or a server of the third-party application cannot obtain information about the second key factor. This may improve security of the data backup process.

It should be further understood that an execution sequence of step 401, step 402, and step 403 is not limited in this application.

404: The SE 30 invokes an applet (applet), where the applet is used to generate the first backup key based on the first key factor and the second key factor, and encrypt the first data by using the first backup key.

Optionally, the first key factor and the second key factor may be combined to generate the first backup key. Alternatively, the first backup key may be synthesized by using another key algorithm, for example, an RSA key generation algorithm or a triple data encryption algorithm (triple data encryption algorithm, 3DES). A manner of generating the first backup key is not limited in this application.

405: The SE 30 sends the first data encrypted by using the first backup key to the Huawei wallet application 12.

404: The Huawei wallet application 12 sends the first data encrypted by using the first backup key to a Hicloud 11.

407: The Hicloud 11 uploads the first data encrypted by using the first backup key to a Hicloud server 42.

It should be understood that the first backup key is a key determined based on two factors: the first key factor and the second key factor. The first key factor is a key determined by a TSM of a mobile phone party, and the second key factor is a key delivered by an access card party. In addition, the mobile phone party cannot learn the second key factor delivered by the access card party, and the access card party cannot learn the first key factor generated by the mobile phone party. Neither party can independently determine the first backup key. In other words, neither party can obtain the first data encrypted by using the first backup key. Therefore, when the first data is backed up and transmitted to a cloud server, security of the first data may be improved, to prevent any party from obtaining private data of the user.

Figure 5:
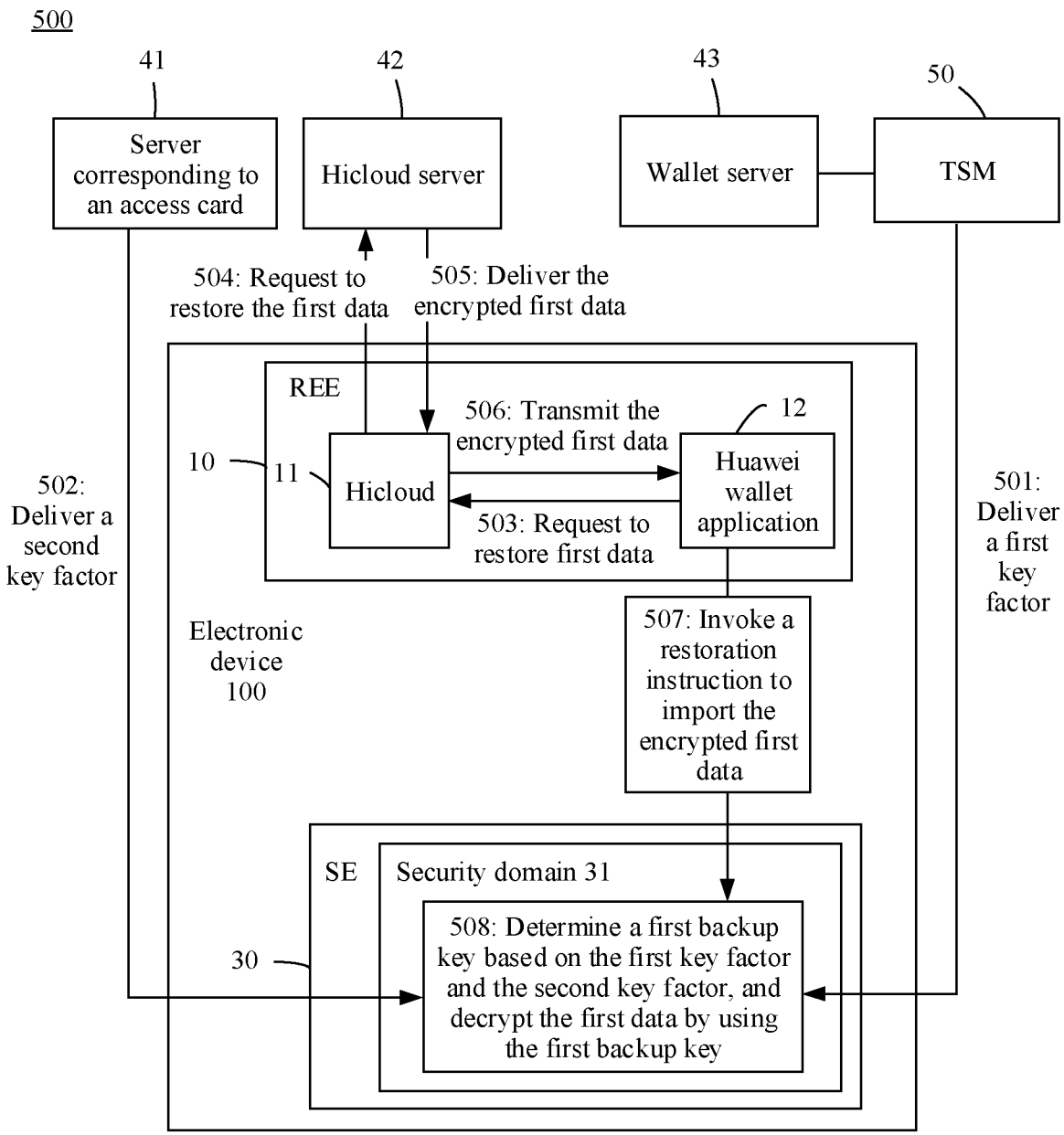
FIG. 5 is a schematic diagram of an implementation process of another secure data restoration method according to an embodiment of this application.

With reference to FIG. 4, the foregoing describes a process of securely backing up the first data by using the SE. Correspondingly, when the user replaces the mobile phone, the first data backed up on the cloud server further needs to be restored to a new mobile phone. FIG. 5 is a schematic diagram of an implementation process of a secure data restoration method according to an embodiment of this application. The method includes the following content.

501: A TSM 50 delivers a first key factor to an SE 30.

502: A server 41 corresponding to an access card delivers a second key factor to the SE 30.

Figure 6:
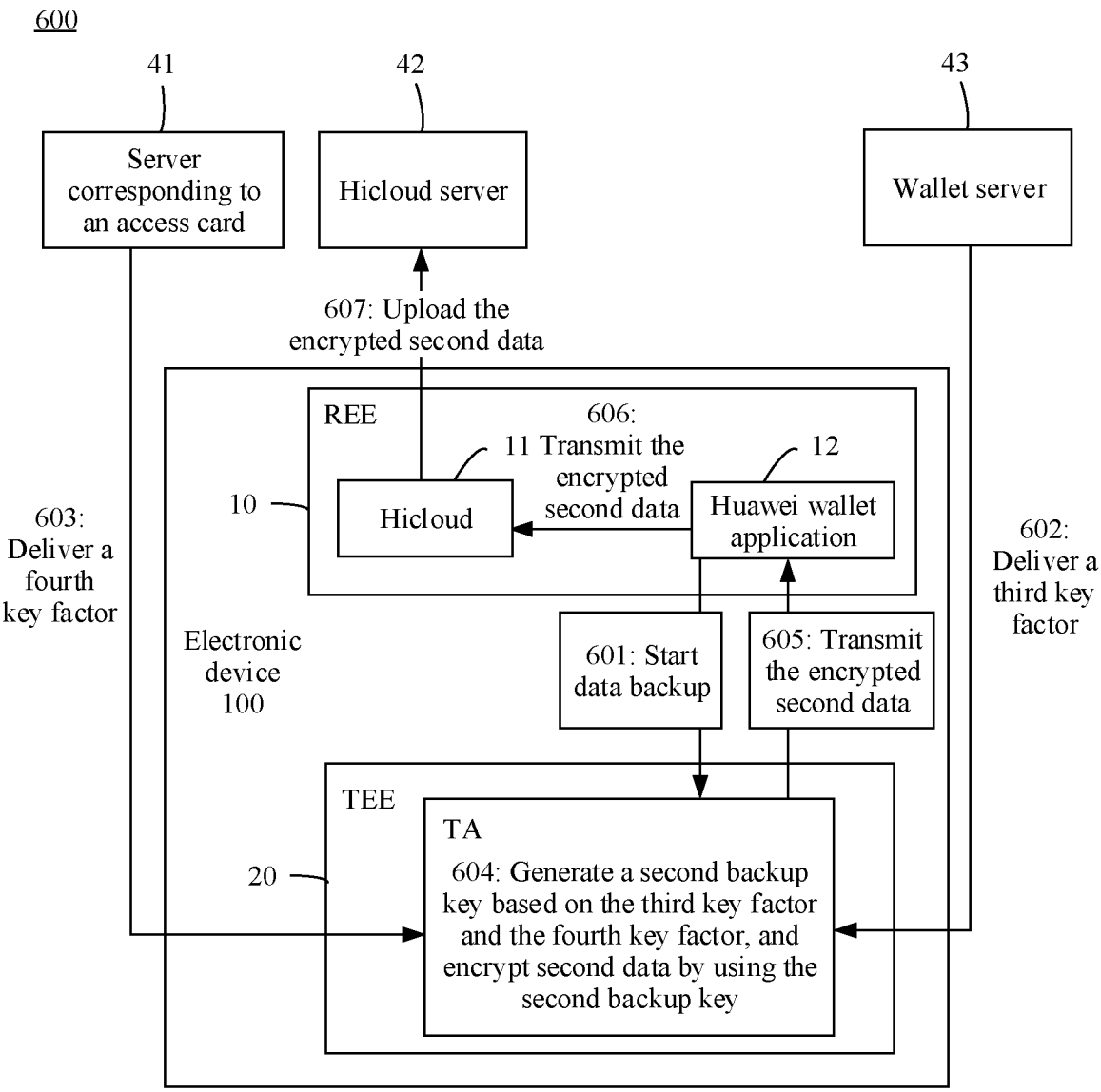
FIG. 6 is a schematic diagram of an implementation process of another secure data backup method according to an embodiment of this application.

It should be understood that, for the foregoing process of delivering the first key factor and the second key factor, reference may be made to related descriptions in FIG. 6. Specifically, for step 501, refer to a process of step 402 in FIG. 4; and for step 502, refer to a process of step 403 in FIG. 4. For brevity, details are not described herein again.

503: A Huawei wallet application requests to restore first data.

It should be understood that an execution sequence of step 501, step 502, and step 503 is not limited in this application.

It should be further understood that step 503 in FIG. 5 shows that a user may start a data restoration process by performing an operation in the Huawei wallet application 12. Optionally, the user may directly start the data restoration process in a setting application. This is not limited in this application.

504: A Hicloud 11 requests a Hicloud server 42 to restore the first data.

Optionally, the user may request a corresponding cloud server through a cloud to restore backed-up data, or request, through another service, to restore the backed-up data. This is not limited in this application.

505: The Hicloud server 42 delivers the encrypted first data to the Hicloud 11.

506: The Hicloud 11 transmits the encrypted first data to the Huawei wallet application 12.

It should be understood that the Hicloud server 42 delivers the encrypted first data herein may be understood as that the encrypted first data is first delivered to an Android system layer, and a ciphertext of the encrypted first data is transmitted to the Huawei wallet application 12.

507: The Huawei wallet application 12 invokes a restoration instruction to import the encrypted first data.

508: The SE 30 generates a first backup key based on the first key factor and the second key factor, and decrypts the first data by using the first backup key.

Specifically, the Huawei wallet application 12 imports the encrypted first data into a security domain 31 of the SE 30, and the SE 30 invokes an applet (applet). The applet is used to determine the first backup key based on the first key factor and the second key factor, decrypt the first data by using the first backup key to obtain the decrypted first data, and store the decrypted first data in the security domain 31.

According to the foregoing technical solution, for the data written into the SE 30, in a data decryption process corresponding to the foregoing data encryption process, a content provider (for example, an access card party) of the NFC card is introduced to generate and deliver a key factor (for example, the second key factor). In addition, in combination with another key factor (for example, the first key factor) provided by a mobile phone party (for example, a Huawei device), a real backup key (for example, the first backup key) is generated in the secure element SE of the mobile phone. In the security domain of the SE, sensitive data (for example, the first data) of the card is decrypted by using the first backup key, to obtain the sensitive data. In this process, sensitive data of the user cannot be independently decrypted and restored by the mobile phone party (for example, the Huawei device) or a third party (for example, the access card party), to ensure data security.

Specifically, the data decryption method may be applied to a restoration process after data backup. A process of restoring data of an NFC card written into the Huawei wallet application is used as an example. When a part of sensitive data (for example, the first data) of the card needs to be restored to the SE, a content provider (for example, the access card party) of the NFC card is introduced to generate and deliver a key factor (for example, the second key factor). In other words, the content provider is responsible for security management of the second key factor. In addition, in combination with another key factor (for example, the first key factor) provided by the mobile phone party (for example, the Huawei device), a real backup key (for example, the first backup key) is generated in the secure element SE of the mobile phone. In the security domain of the SE, the sensitive data (for example, the first data) of the card is decrypted by using the first backup key, to obtain the sensitive data of the card. The mobile phone party cannot learn the second key factor delivered by the access card party, and the access card party cannot learn the first key factor generated by the mobile phone party. Neither party can independently determine the first backup key. In other words, the mobile phone party (for example, the Huawei device) or the third party (for example, the access card party)

cannot independently decrypt and restore the sensitive data of the user. This implements reliable and secure backup of the data.

In another possible implementation, in a trusted execution environment TEE, the TEE obtains second data, where the second data includes data, in a first application, that is about an application system layer of a first card. The TEE receives a third key factor sent by a server corresponding to the first application, where the third key factor is a key factor generated by the server corresponding to the first application based on user information in the first application. The TEE obtains a fourth key factor. The TEE generates a second backup key based on the third key factor and the fourth key factor. The TEE encrypts the second data by using the second backup key.

It should be understood that, in the foregoing process of writing NFC card data into the Huawei wallet application, a part of data needs to be stored in the security domain of the SE, and the part of data relates to card information with a relatively high security requirement. The part of data stored in the security domain of the SE is referred to as the "first data". Other than the first data, another part of data needs to be stored at the Android system layer. In this embodiment of this application, the part of data stored at the Android system layer is referred to as personalized user data, for example, a user name, a user image, a user gender, an address, or other data. In a data backup process, the personalized user data may be encrypted at the Android system layer to meet a security requirement.

Optionally, the second data may include only the personalized user data stored at the Android system layer.

Specifically, the access card is used as an example. The first data may include a serial number of the access card. When the access card is written into the Huawei wallet application, the TSM may create the security domain (security domain) in the SE, and write the serial number of the access card into the security domain. In other words, the serial number of the access card is stored in the SE. The second data may include the personalized user data, for example, the user name, the user gender, the user address, or other information; and the second data is stored at the Android system layer.

For another example, a bank card is used as an example. The first data may include a serial number of the bank card, transaction content and a transaction amount of the user, a personal identification number entered by the user, a key resource in a mobile payment service process, or the like. The foregoing data is written and stored in the security domain of the SE. The second data may include the personalized user data, for example, the user name, the user image, the user gender, or the address; and the second data is stored at the Android system layer.

For another example, in addition to various types of NFC cards in the Huawei wallet application, for the mobile phone, the second data may further include data such as an album of the user.

Optionally, in addition to the personalized user data stored at the Android system layer, the second data may further include the ciphertext of the first data encrypted by using the first backup key.

It should be understood that, in a process of step 405 in FIG. 4, the SE 30 transmits the ciphertext of the first data encrypted by using the first backup key to the Android system layer, for example, transmits the ciphertext to the Huawei wallet application 12. In this case, with reference to the secure data backup method provided in FIG. 6, the ciphertext of the first data and the data at the Android system layer may be used as the second data, encrypted by using the second backup key, and then backed up to a cloud. Content of the second data is not limited in this application.

With reference to FIG. 6, a data backup process of an access card in a Huawei wallet application is used as an example in the following to describe in detail a backup process of second data of the access card. The process includes the following content.

601: A user starts the data backup process.

It should be understood that the user may start the data backup process by performing an operation in the Huawei wallet application 12. Optionally, the user may directly start the backup process in a setting application, to back up all user data. This is not limited in this application.

602: A wallet server 43 delivers a third key factor to a trusted execution environment TEE 20.

Specifically, when the Huawei wallet application 12 is started, the Huawei wallet application 12 sends a request to the wallet server 43. The wallet server 43 generates the third key factor based on a user account, and stores the third key factor in a TA.

It should be understood that, as described above, the TEE provides a secure execution environment for the trusted application TA, and the TEE may store the received third key factor or a received fourth key factor in the TA.

It should be further understood that, in a process of delivering the third key factor, interaction between a plurality of servers is also involved, and encrypted transmission needs to be performed to ensure data transmission security. When the access card is written into the Huawei wallet application, the TA of the mobile phone generates a temporary RSA public-private key pair, and transmits a public key to a server 41 corresponding to the access card and the wallet server 43 through the Huawei wallet application. Therefore, delivery of the third key factor may be encrypted by using the temporary RSA public key. The wallet server 43 encrypts the third key factor based on the temporary RSA public key, and transmits the third key factor to the Huawei wallet application 12. The Huawei wallet application 12 delivers the encrypted third key factor to the TA, and writes and stores the third key factor in the TA.

When receiving the encrypted third key factor, the TA may perform decryption by using a previously generated temporary RSA private key, and destroy the generated temporary public and private keys after the decryption is completed.

The third key factor is encrypted by using the temporary RSA public key. In the data backup process, another third-party application such as the Huawei wallet application or a server of the third-party application cannot obtain information about the third key factor. This may improve security of the data backup process.

603: The TEE 20 obtains the fourth key factor.

It should be understood that an execution sequence of step 601, step 602, and step 603 is not limited in this application.

In a possible implementation, in step 603 shown in FIG. 6, the server 41 corresponding to the access card delivers the fourth key factor to the TEE 20.

Specifically, when the access card is written into the Huawei wallet application 12, the server 41 corresponding to the access card needs to be notified. The server 41 corresponding to the access card delivers the fourth key factor to the TEE 20, and stores the fourth key factor in the TA. In this implementation, the fourth key factor is also delivered after being encrypted by the server 41 corresponding to the access card.

In another possible implementation, the fourth key factor is a value randomly generated by the TA. In this implementation, the fourth key factor needs to be backed up. It should be understood that a source and a form of the fourth key factor are not limited in this application.

Optionally, the TEE 20 encrypts the fourth key factor by using the third key factor, and then the TEE 20 uploads the encrypted fourth key factor to a cloud server.

In a possible implementation, when the encrypted fourth key factor is uploaded to the cloud server, an encryption window may be popped up on an interface of the Huawei wallet application 12, and the window may be used by the user to enter an authentication manner. For example, the user may enter a password manually or select a biometric authentication method supported by the mobile phone. Before uploading the encrypted fourth key factor, the TEE 20 performs encryption by using the password manually entered by the user or the biometric authentication method. The biometric authentication method includes but is not limited to fingerprint recognition, facial information verification, infrared sensing, or the like.

After biometric authentication of the user is authorized, the Huawei wallet application 12 sends a ciphertext of the fourth key factor that is encrypted twice to the cloud server for backup, or the Huawei wallet application 12 sends a ciphertext of the fourth key factor that is encrypted twice to the wallet server for backup.

In the foregoing solution, participation of the user may further be introduced. The fourth key factor is further encrypted by using the biometric authentication input by the user, to ensure security of the fourth key factor, and prevent the fourth key factor from being stolen by the third party in the data backup process. This improves security of the data backup process.

604: Generate a second backup key based on the third key factor and the fourth key factor, and encrypt the second data by using the second backup key.

Specifically, the TA may generate the second backup key based on the third key factor and the fourth key factor. Optionally, the third key factor and the fourth key factor may be combined to generate the second backup key. Alternatively, the second backup key may be synthesized by using another key algorithm, for example, an RSA key generation algorithm or a 3DES encryption algorithm. A manner of generating the second backup key is not limited in this application.

605: The TEE 20 transmits the second data encrypted by using the second backup key to the Huawei wallet application 12.

606: The Huawei wallet application 12 transmits the second data encrypted by using the second backup key to a Hicloud 11.

607: The Hicloud 11 uploads, to a Hicloud server 42, the second data encrypted by using the second backup key.

It should be understood that the second backup key is a key determined based on two factors: the third key factor and the fourth key factor. The third key factor is a key delivered by a Huawei wallet application party, and the fourth key factor may be a key generated in the TA or a key delivered by an access card party.

Therefore, according to the foregoing technical solution, a mobile phone party cannot learn the third key factor delivered by the Huawei wallet application party, and the Huawei wallet application party cannot learn the fourth key factor generated by the mobile phone party or the fourth key factor delivered by the access card party. None of the parties can independently determine the second backup key. In other words, none of the parties can obtain the second data encrypted by using the second backup key. Therefore, when the second data is backed up and transmitted to the cloud server, security of the second data may be improved, to prevent any party from obtaining private data of the user.

In addition, the method for encrypting the first data by using the SE described in FIG. 4 may be used in combination with the method for encrypting the second data by using the TEE described in FIG. 6. To be specific, both the first data encrypted by using the first backup key and the personalized user data at the Android system layer are used as the second data, encrypted by using the second backup key, and then uploaded to the cloud server for backup. When the second data includes the ciphertext of the first data, because the first data is further encrypted by using the second backup key, data backup security is further improved in a process of backing up the first data to the cloud server.

Figure 7:
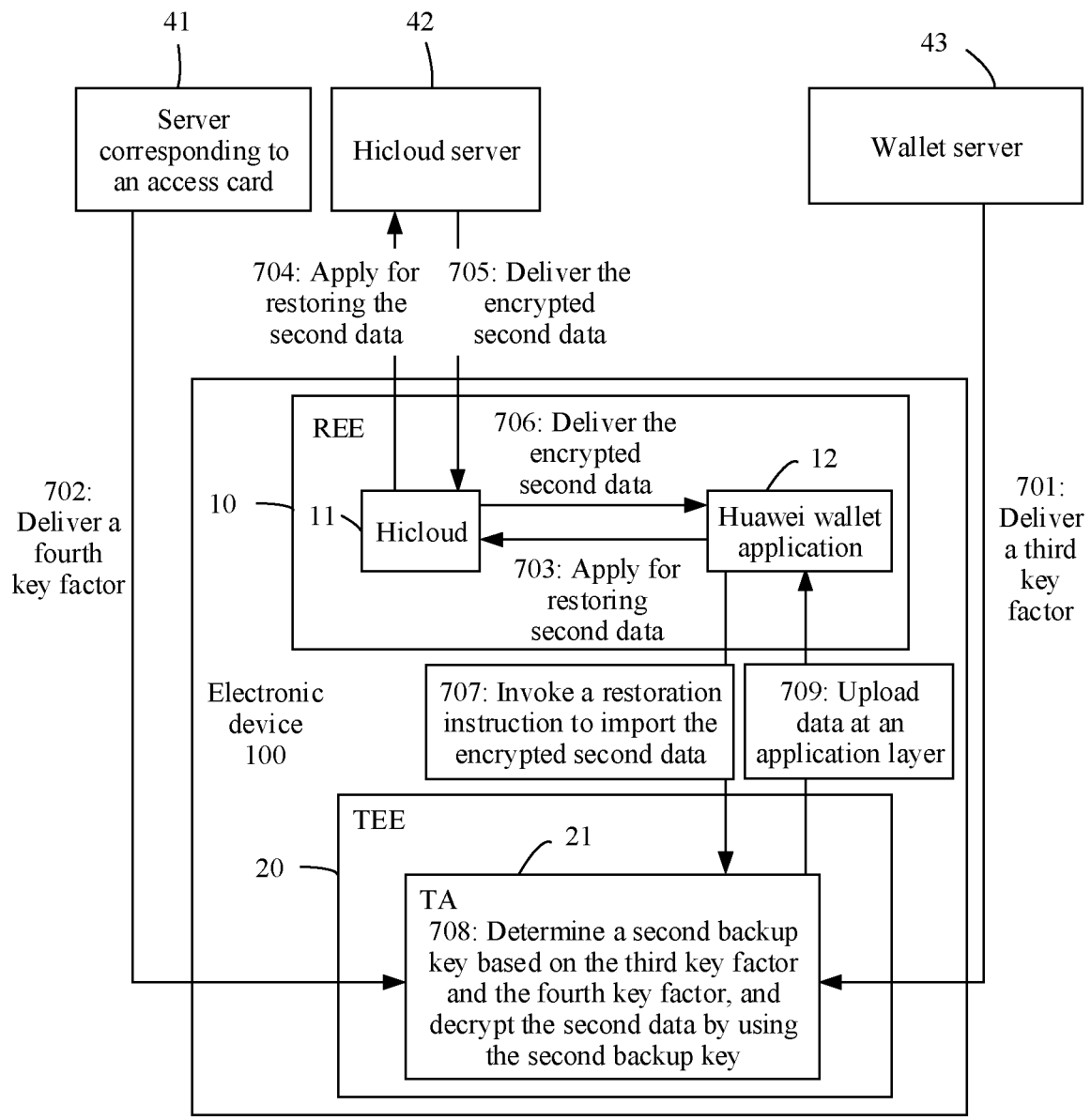
FIG. 7 is a schematic diagram of an implementation process of another secure data restoration method according to an embodiment of this application.

With reference to FIG. 6, the foregoing describes a process of securely backing up the second data by using the TEE. Correspondingly, when the user replaces the mobile phone, the second data backed up on the cloud server further needs to be restored to a new mobile phone. FIG. 7 is a schematic diagram of an implementation process of a secure data restoration method according to an embodiment of this application. The method includes the following content.

701: A wallet server 43 delivers a third key factor to a TEE 20.

702: The TEE 20 obtains a fourth key factor.

In a possible implementation, the fourth key factor may be delivered by a server 41 corresponding to an access card to the TEE 20. In this case, in a data restoration process, the fourth key factor is also delivered to the TEE after being encrypted by the server 41 corresponding to the access card.

Specifically, when applying to restore second data, a Huawei wallet application 12 needs to notify the server 41 corresponding to the access card. The server 41 corresponding to the access card delivers the encrypted fourth key factor to the TEE 20, and stores the fourth key factor in a TA.

In another possible implementation, the fourth key factor is a value randomly generated by the TA.

In this implementation, after the fourth key factor is encrypted by using the third key factor, the TEE 20 uploads the fourth key factor to a Hicloud server 42. In this case, in the data restoration process, before applying to restore the second data, the Huawei wallet application 12 first restores the TEE 20, and requests, from the Hicloud server 42, to obtain the fourth key factor that is previously backed up and that is encrypted twice.

Optionally, if a user adds biometric authentication when uploading the encrypted fourth key factor to a cloud server, when obtaining a ciphertext of the fourth key factor that is encrypted twice, the TEE 20 needs to pop up a window for the user to perform biometric authentication to determine an identity of the user. When the authentication succeeds, that is, it is determined that a user performing a change operation is the user previously performing the backup operation, the TEE 20 obtains the fourth key factor encrypted by using the third key factor. Then, the TEE 20 decrypts the fourth key factor based on the third key factor, to obtain a plaintext of the fourth key factor. The biometric authentication method includes but is not limited to a digit password, fingerprint recognition, facial information verification, infrared sensing, or the like.

703: The Huawei wallet application 12 applies to the Hicloud 11 for restoring the second data.

704: The Hicloud 11 applies to the Hicloud server 42 for restoring the second data.

It should be understood that an execution sequence of steps 703 and 704 and steps 701 and 702 is not limited in this application.

705: The Hicloud server 42 delivers the encrypted second data to the Hicloud 11.

706: The Hicloud 11 delivers the encrypted second data to the Huawei wallet application 12.

707: The Huawei wallet application 12 invokes a restoration instruction to import the encrypted second data to the TEE 20.

708: The TEE 20 determines a second backup key based on the third key factor and the fourth key factor, and decrypts the second data by using the second backup key.

709: The TEE 20 uploads personalized user data that is at an application layer and that is included in the second data to the Huawei wallet application, and stores the data in a local folder.

In a possible implementation, the second data may include only a part of data stored at an Android system layer. In this case, after decrypting the second data based on the second backup key, the TEE 20 obtains personalized user data at the Android system layer, and uploads and stores the personalized user data to the local folder of the Huawei wallet application 12. That is, the data restoration process is completed.

Optionally, in addition to the part of data stored at the Android system layer, the second data may further include a ciphertext of first data encrypted by using a first backup key. Specifically, the TEE 20 receives a ciphertext of the second data encrypted by using the second backup key, and decrypts the ciphertext based on the second backup key, to obtain the second data. The second data includes the ciphertext of the first data encrypted by using the first backup key and a plaintext of the personalized user data at the Android system layer. In this case, the TEE 20 stores the ciphertext of the first data, and transmits the plaintext of the personalized user data at the Android system layer to the Huawei wallet application 12. Then, the TEE 20 delivers the ciphertext of the first data to a SE 30. The SE 30 decrypts the first data to obtain the first data, and stores the first data in a security domain of the SE. For a specific process, refer to step 707 and step 708 in FIG. 7. For brevity, details are not described herein again.

According to the foregoing technical solution, in a data decryption process that is in the TEE and that corresponds to a data encryption process in the TEE, a content provider (for example, an access card party) of the NFC card is introduced, to generate and deliver a key factor (for example, the fourth key factor). In other words, the content provider is responsible for security management of the fourth key factor. Alternatively, the fourth key factor is randomly generated by a mobile phone party (for example, a Huawei device). In addition, in combination with another key factor (for example, the third key factor) provided by a trusted third party (for example, the Huawei wallet application), a real backup key (for example, the second backup key) is generated in the TEE of the mobile phone. The personalized user data is encrypted in the TEE by using the second backup key and may be uploaded to a cloud for backup. Sensitive data of the user cannot be independently decrypted and restored by the mobile phone party (for example, the Huawei device), the trusted third party (for example, the Huawei wallet application), or a third-party service (for example, the access card party), to ensure data security.

In addition, in the security domain of the SE, the sensitive data (for example, the first data) that is of the card and that is encrypted by using the first backup key may further be combined with the personalized user data at the Android system layer to form the second data. After being encrypted again in the TEE, the second data is uploaded to the cloud for backup. This improves security of the data backup process, thereby implementing reliable and secure backup of the data, and improving user experience. Similarly, in the data decryption process, the second data is first decrypted in the TEE by using the second backup key, to obtain the plaintext of the personalized user data at the Android system layer and the ciphertext of the first data encrypted by using the first backup key. In addition, the plaintext of the personalized user data at the Android system layer is transmitted to the Huawei wallet application, and the TEE further delivers the ciphertext of the first data to the SE. The SE decrypts the first data based on the first backup key, to obtain the first data, and stores the first data in the security domain of the SE.

Figure 8A:
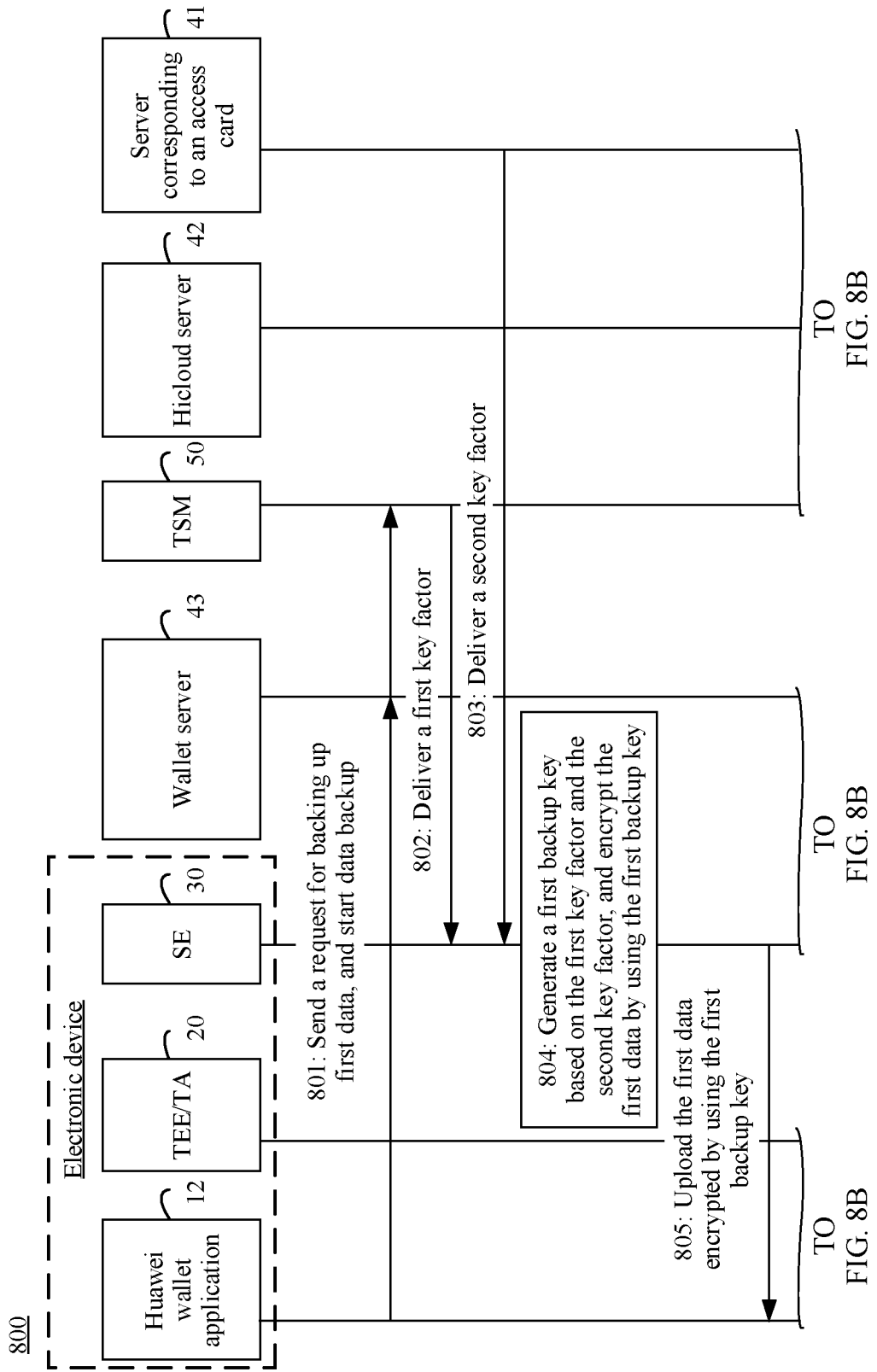
FIG. 8A and FIG. 8B are a schematic diagram of an implementation process of a secure data backup method according to an embodiment of this application.
Figure 8B:
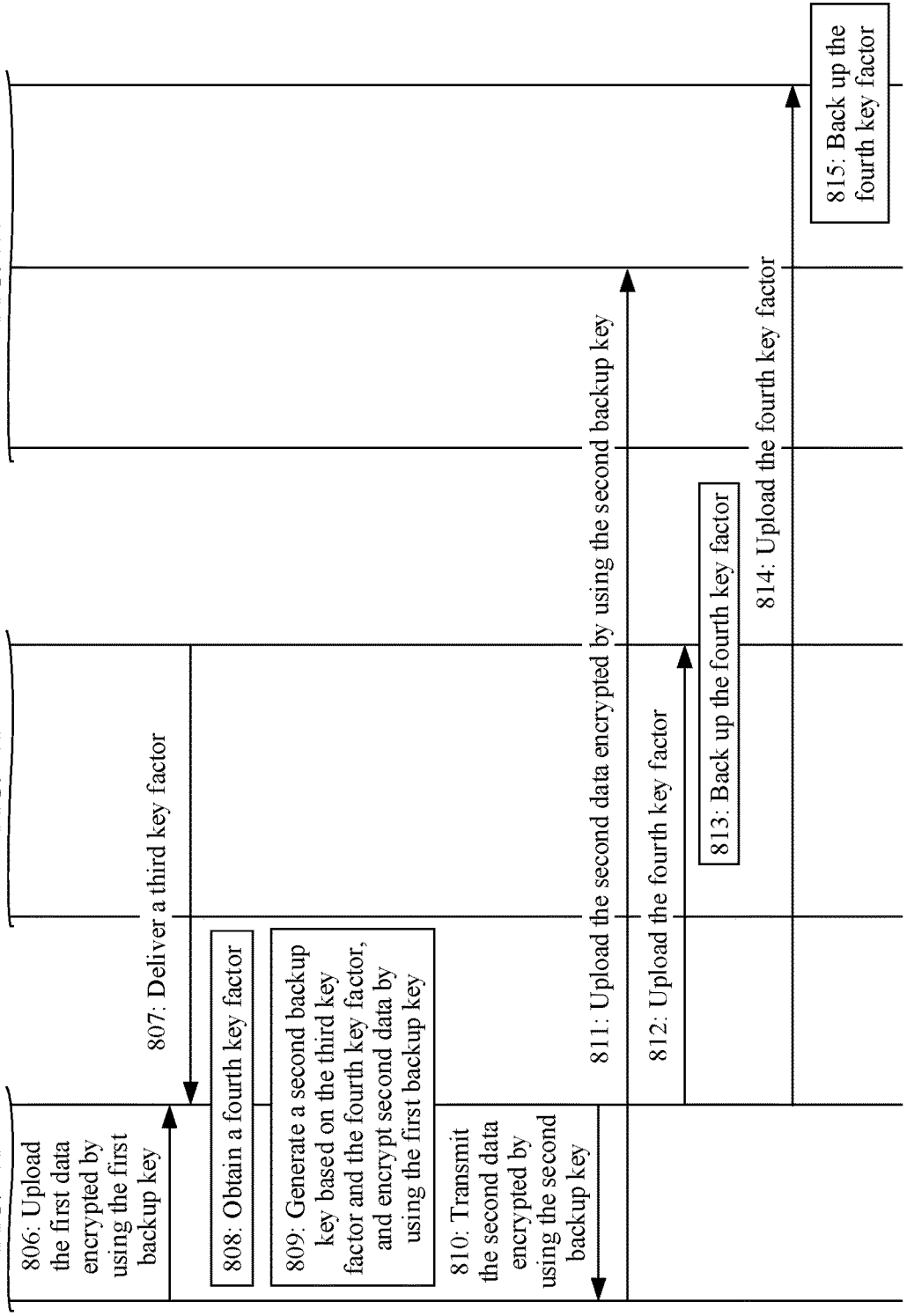

With reference to the foregoing embodiments and related accompanying drawings, the embodiments of this application provide a secure data backup method and a secure data restoration method. The methods may be implemented in an electronic device (for example, a mobile phone or a tablet computer). FIG. 8A and FIG. 8B are a schematic diagram of an implementation process of a secure data backup method according to an embodiment of this application. A data backup process of an access card in a Huawei wallet application is used as an example to describe a secure data backup process. As shown in FIG. 8A and FIG. 8B, the process may include the following steps.

801: The Huawei wallet application 12 sends a request for backing up first data to a wallet server 43 to start a data backup process, and the wallet server 43 invokes a TSM 50.

802: The TSM 50 delivers a first key factor to an SE 30, and stores the first key factor in a security domain of the SE.

803: A server 41 corresponding to an access card delivers a second key factor to the SE 30, and stores the second key factor in the security domain 31 of the SE.

Specifically, when the access card is written into the Huawei wallet application 12, the server 41 corresponding to the access card needs to be notified. The server 41 corresponding to the access card delivers the second key factor to the SE 30, and stores the second key factor in the security domain 31.

In a possible implementation, the server 41 corresponding to the access card may request, through the Huawei wallet application 12, the wallet server 43 to deliver the second key factor through the TSM 50. Therefore, although the second key factor shown in FIG. 9 is delivered by the server 41 of the access card to the SE 30, actually, the second key factor may alternatively be delivered by the TSM 50 to the SE 30. This is not limited in this application.

It should be understood that, in a process of delivering the second key factor, interaction between a plurality of servers is involved, and encrypted transmission needs to be performed to ensure data transmission security. The Huawei wallet application notifies the SE to generate a temporary RSA key pair when generating the blank card, and transmit a public key to the server 41 corresponding to the access card through the Huawei wallet application. Therefore, delivery of the second key factor may be encrypted by using the temporary RSA public key. The server 41 corresponding to the access card transmits data that needs to be written into the access card and the second key factor encrypted by using the temporary RSA public key to the Huawei wallet application 12. The Huawei wallet application 12 delivers the encrypted data to the SE through a secure channel by using the TSM, and writes and stores the encrypted data into the blank card.

When receiving the encrypted second key factor, the SE 30 may perform decryption in the blank card by using a previously generated temporary RSA private key, and destroy the generated temporary public and private keys after the decryption is completed.

The second key factor is encrypted by using the temporary RSA public key. In the data backup process, another third-party application such as the Huawei wallet application or a server of the third-party application cannot obtain information about the second key factor. This may improve security of the data backup process.

804: The SE invokes an applet (applet), where the applet is used to generate a first backup key based on the first key factor and the second key factor, and encrypt the first data by using the first backup key.

Optionally, the first key factor and the second key factor may be combined to generate the first backup key. Alternatively, the first backup key may be synthesized by using another key algorithm, for example, an RSA key generation algorithm or a triple data encryption algorithm (triple data encryption algorithm, 3DES). A manner of generating the first backup key is not limited in this application.

805: The SE 30 sends, to the Huawei wallet application 12, the first data encrypted by using the first backup key.

It should be understood that the first data is data written into the secure element SE. This part of data relates to card information, and therefore has a relatively high security requirement.

806: The Huawei wallet application 12 sends the first data encrypted by using the first backup key to a TEE 20.

807: The wallet server 43 delivers a third key factor to the TEE 20.

Specifically, when the Huawei wallet application 12 is started, the Huawei wallet application 12 sends a request to the wallet server 43. The wallet server 43 generates the third key factor based on a user account, and stores the third key factor in a TA.

It should be understood that, in a process of delivering the third key factor, interaction between a plurality of servers is also involved, and encrypted transmission needs to be performed to ensure data transmission security. When the access card is written into the Huawei wallet application, the TA of the mobile phone generates a temporary RSA public-private key pair, and transmits a public key to the server 41 corresponding to the access card and the wallet server 43 through the Huawei wallet application. Therefore, delivery of the third key factor may be encrypted by using the temporary RSA public key. The wallet server 43 encrypts the third key factor based on the temporary RSA public key, and transmits the third key factor to the Huawei wallet application 12. The Huawei wallet application 12 delivers the encrypted third key factor to the TA, and writes and stores the third key factor in the TA. When receiving the encrypted third key factor, the TA may perform decryption by using a previously generated temporary RSA private key, and destroy the generated temporary public and private keys after the decryption is completed.

The third key factor is encrypted by using the temporary RSA public key. In the data backup process, another third-party application such as the Huawei wallet application or a server of the third-party application cannot obtain information about the third key factor. This may improve security of the data backup process.

808: The TEE 20 obtains a fourth key factor.

Optionally, the fourth key factor obtained by the TEE 20 is delivered by the server 41 corresponding to the access card. Specifically, when the access card is written into the Huawei wallet application 12, the server 41 corresponding to the access card needs to be notified. The server 41 corresponding to the access card delivers the fourth key factor to the TEE 20, and stores the fourth key factor in the TA. In this case, the fourth key factor does not need to be backed up, because the server 41 corresponding to the access card knows the fourth key factor delivered by the server 41.

Alternatively, the fourth key factor is a value randomly generated by the TA in the TEE 20. In this implementation, the fourth key factor needs to be backed up. It should be understood that a source and a form of the fourth key factor are not limited in this application.

Optionally, the TEE 20 encrypts the fourth key factor by using the third key factor, and then the TEE 20 uploads the encrypted fourth key factor to a cloud server. Specifically, the following steps may be performed: step 812 in which the TEE 20 uploads the encrypted fourth key factor to the wallet server 43; and step 813 in which the wallet server 43 backs up the encrypted fourth key factor. Alternatively, the following steps may be performed: step 814 in which the TEE 20 uploads the encrypted fourth key factor to the server 41 corresponding to the access card; and step 815 in which the server 41 corresponding to the access card backs up the encrypted fourth key factor. This is not limited in this application.

In a possible implementation, when the encrypted fourth key factor is uploaded to the cloud server, an encryption window may be popped up on an interface of the Huawei wallet application 12, and the window may be used by the user to enter an authentication manner. For example, the user may enter the password manually or select a biometric authentication method supported by the mobile phone. Before uploading the encrypted fourth key factor, the TEE 20 performs encryption by using the password manually entered by the user or the biometric authentication method. biometric authentication method includes but is not limited to fingerprint recognition, facial information verification, infrared sensing, or the like.

After biometric authentication of the user is authorized, the Huawei wallet application 12 sends a ciphertext of the fourth key factor that is encrypted twice to a Hicloud server for backup, or the Huawei wallet application 12 sends a ciphertext of the fourth key factor that is encrypted twice to the wallet server 43 for backup.

In the foregoing solution, participation of the user may further be introduced. The fourth key factor is further encrypted by using the biometric authentication input by the user, to ensure security of the fourth key factor, and prevent the fourth key factor from being stolen by a third party in the data backup process. This improves security of the data backup process.

809: The TEE 20 generates a second backup key based on the third key factor and the fourth key factor, and encrypts second data by using the first backup key.

Optionally, the second data may include only a part of data stored at an Android system layer.

Alternatively, in addition to the part of data stored at the Android system layer, the second data may further include a ciphertext of the first data encrypted by using the first backup key.

Specifically, the TA may generate the second backup key based on the third key factor and the fourth key factor. Optionally, the third key factor and the fourth key factor may be combined to generate the second backup key. Alternatively, the second backup key may be synthesized by using another key algorithm, for example, an RSA key generation algorithm or a 3DES encryption algorithm. A manner of generating the second backup key is not limited in this application. When the second data includes the ciphertext of the first data encrypted by using the first backup key and the part of data at the Android system layer, the TEE 20 encrypts the two parts of second data based on the second backup key.

810: The TEE 20 transmits the second data encrypted by using the second backup key to the Huawei wallet application 12.

811: The Huawei wallet application 12 transmits the second data encrypted by using the second backup key to the Hicloud 11, and the Hicloud 11 uploads the encrypted second data to the Hicloud server 42, to back up the data on the cloud server.

It should be understood that the second backup key is a key determined based on two factors: the third key factor and the fourth key factor. The third key factor is a key delivered by a Huawei wallet application party, and the fourth key factor may be a key generated in the TA or a key delivered by an access card party.

Therefore, according to the foregoing technical solution, a mobile phone party cannot learn the third key factor delivered by the Huawei wallet application party, and the Huawei wallet application party cannot learn the fourth key factor generated by the mobile phone party or the fourth key factor delivered by the access card party. None of the parties can independently determine the second backup key. In other words, none of the parties can obtain the second data encrypted by using the second backup key. Therefore, when the second data is backed up and transmitted to the cloud server, security of the second data may be improved, to prevent any party from obtaining private data of the user. In addition, a part of sensitive data (for example, the first data) of a third-party card is stored in the SE. When the part of sensitive data (for example, the first data) of the card is backed up from the SE, a content provider (for example, the access card party) of the NFC card is introduced to generate and deliver a key factor (for example, the second key factor). In other words, the content provider is responsible for security management of the second key factor. In addition, in combination with another key factor (for example, the first key factor) provided by the mobile phone party (for example, a Huawei device), a real backup key (for example, the first backup key) is generated in the secure element SE of the mobile phone. In the security domain of the SE, the sensitive data (for example, the first data) of the card is encrypted by using the first backup key and may be uploaded to a cloud for backup. The mobile phone party (for example, the Huawei device) or the third party (for example, the access card party) cannot independently decrypt and restore the sensitive data of the user. This implements reliable and secure backup of the data.

Figure 9A:
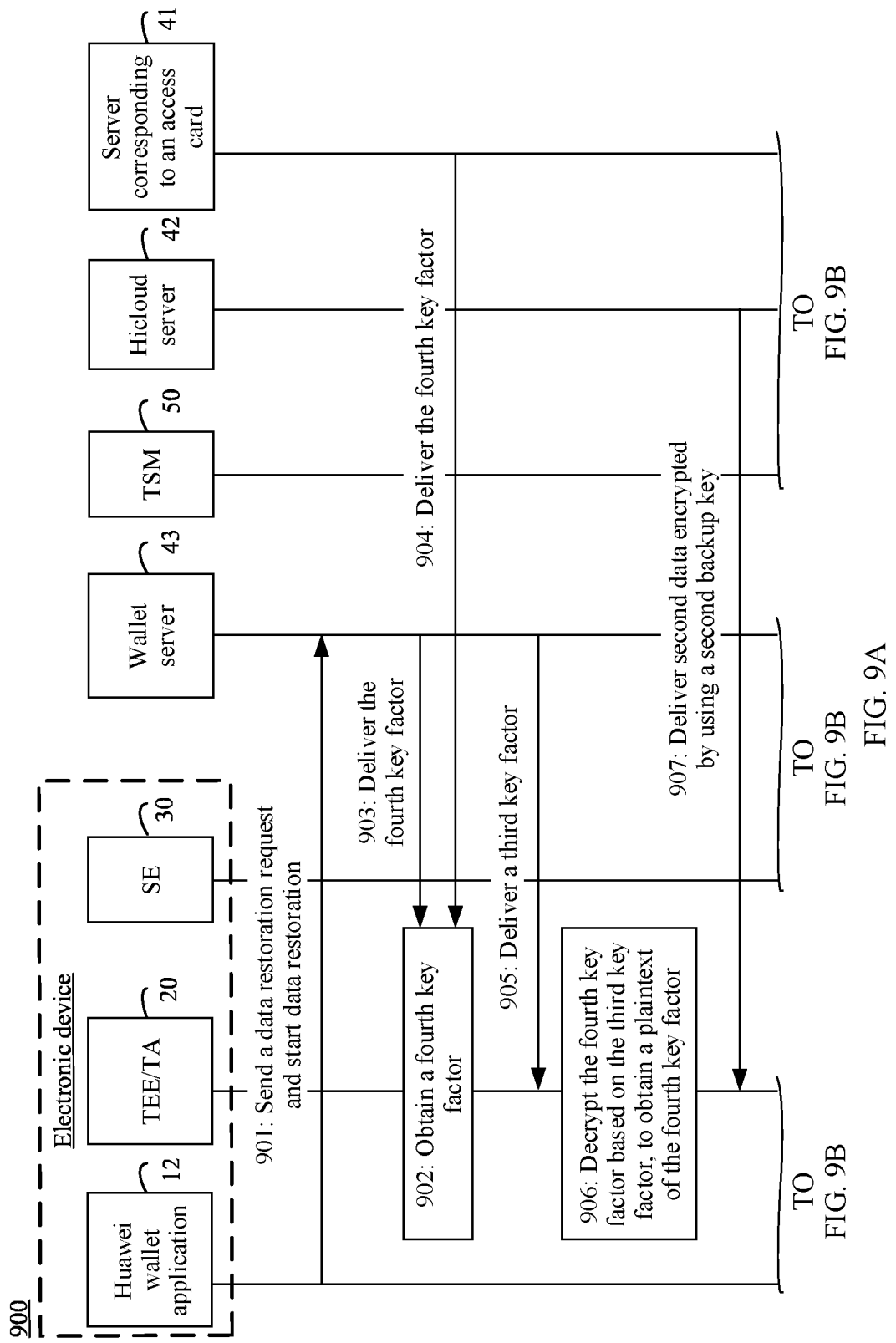
FIG. 9A and FIG. 9B are a schematic diagram of an implementation process of a secure data restoration method according to an embodiment of this application.
Figure 9B:
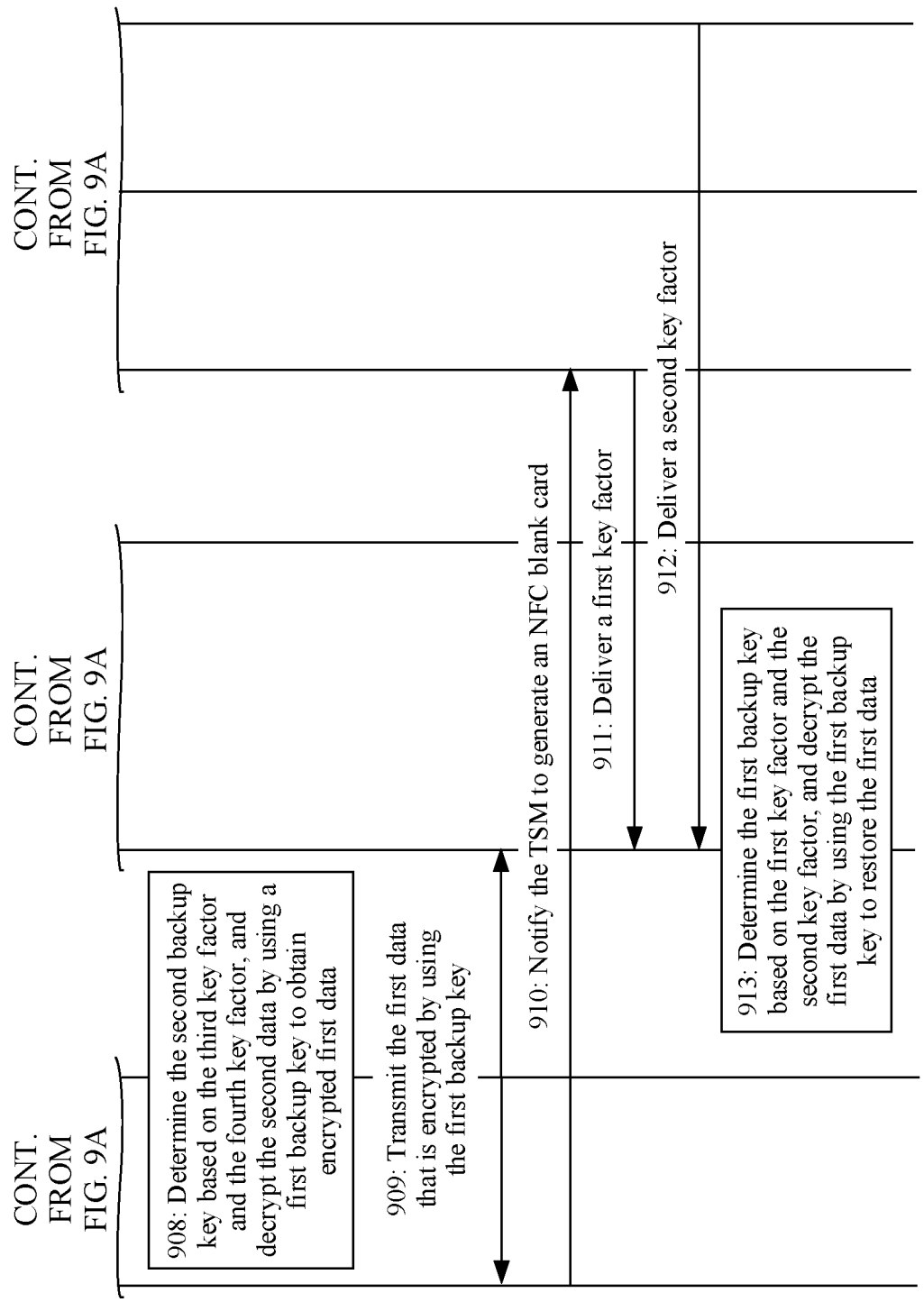

According to the foregoing method, the secure data backup process is completed. Correspondingly, when the user replaces the mobile phone, the data backed up on the cloud server needs to be restored to a new mobile phone. FIG. 9A and FIG. 9B are a schematic diagram of an implementation process of a secure data restoration method according to an embodiment of this application. The method includes the following content.

901: A Huawei wallet application 12 sends a data restoration request to start a data restoration process.

902: A TEE 20 obtains a fourth key factor.

In a possible implementation, as shown in step 904, the fourth key factor may be delivered by a server 41 corresponding to an access card to the TEE 20. Alternatively, as shown in step 903, the fourth key factor is delivered by a wallet server 43 to the TEE 20. In this case, in the data restoration process, the fourth key factor is also delivered to the TEE after being encrypted by the server 41 corresponding to the access card or the wallet server 43.

Specifically, when applying for data restoration, the Huawei wallet application 12 needs to notify the server 41 corresponding to the access card and the wallet server 43. The server 41 corresponding to the access card or the wallet server 43 delivers the encrypted fourth key factor to the TEE 20, and stores the fourth key factor in a TA.

In another possible implementation, the fourth key factor is a value randomly generated by the TA, and the fourth key factor may be understood as a value generated by the mobile phone.

In this implementation, after the fourth key factor is encrypted by using a third key factor, the TEE 20 uploads the fourth key factor to a Hicloud server 42. In this case, in the data restoration process, before applying to restore second data, the Huawei wallet application 12 first restores the TEE 20, and requests, from the Hicloud server 42, to obtain the fourth key factor that is previously backed up and that is encrypted twice.

Optionally, if a user adds biometric authentication when uploading the encrypted fourth key factor to a cloud server, when obtaining a ciphertext of the fourth key factor that is encrypted twice, the TEE 20 needs to pop up a window for the user to perform biometric authentication to determine an identity of the user. When the authentication succeeds, that is, it is determined that a user performing a change operation is the user previously performing the backup operation, the TEE 20 obtains the fourth key factor encrypted by using the third key factor. Then, the TEE 20 decrypts the fourth key factor based on the third key factor, to obtain a plaintext of the fourth key factor. biometric authentication method includes but is not limited to a digit password, fingerprint recognition, facial information verification, infrared sensing, or the like.

905: The wallet server 43 delivers the third key factor to the TEE 20.

906: The TEE 20 decrypts the fourth key factor based on the third key factor, to obtain the plaintext of the fourth key factor.

907: The Hicloud server 42 delivers the second data that is encrypted by using a second backup key to a Hicloud 11.

In step 1107, a plurality of arrows are marked to indicate an intermediate process of requesting data restoration. For example, the Huawei wallet application 12 applies to the Hicloud 11 for restoring the second data; the Hicloud 11 applies to the Hicloud server 42 for restoring the second data; the Hicloud server 42 delivers the encrypted second data to the Hicloud 11; the Hicloud 11 delivers the encrypted second data to the Huawei wallet application 12; and the Huawei wallet application 12 invokes a restoration instruction to import the encrypted second data to the TEE 20.

908: The TEE 20 determines the second backup key based on the third key factor and the fourth key factor, and decrypts the second data by using the first backup key.

In a possible implementation, the second data may include only a part of data stored at an Android system layer. In this case, after decrypting the second data based on the second backup key, the TEE 20 obtains personalized user data at the Android system layer, and uploads and stores the personalized user data to a local folder of the Huawei wallet application 12. That is, the data restoration process is completed.

Optionally, in addition to the part of data stored at the Android system layer, the second data may further include a ciphertext of first data encrypted by using a first backup key.

909: The TEE 20 transmits the first data encrypted by using the first backup key to the SE 30.

Specifically, the TEE 20 receives a ciphertext of the second data encrypted by using the second backup key, and performs decryption based on the second backup key, to obtain the second data. The second data includes the ciphertext of the first data encrypted by using the first backup key and a plaintext of the personalized user data at the Android system layer. In this case, the TEE 20 stores the ciphertext of the first data, and transmits the plaintext of the personalized user data at the Android system layer to the Huawei wallet application 12. Then, the TEE 20 delivers the ciphertext of the first data to a SE 30. The SE 30 decrypts the first data to obtain the first data, and stores the first data in a security domain of the SE.

910: The Huawei wallet application 12 notifies the wallet server 43, and the wallet server 43 notifies a TSM to manage the SE to generate an NFC blank card.

911: The TSM 50 delivers a first key factor to the SE 30.

912: The server 41 corresponding to the access card delivers a second key factor to the SE 30.

It should be understood that, in a process of delivering the second key factor, interaction between a plurality of servers is involved, and encrypted transmission needs to be performed to ensure data transmission security. The Huawei wallet application notifies the SE to generate a temporary public-private RSA key pair when generating the blank card, and transmit a public key to the server 41 corresponding to the access card through the Huawei wallet application. Therefore, delivery of the second key factor may be encrypted by using the temporary RSA public key. The server 41 corresponding to the access card transmits data that needs to be written into the access card and the second key factor encrypted by using the temporary RSA public key to the Huawei wallet application 12. The Huawei wallet application 12 delivers the encrypted data to the SE through a secure channel by using the TSM, and writes and stores the encrypted data into the blank card.

When receiving the encrypted second key factor, the SE 30 may perform decryption in the blank card by using a previously generated temporary RSA private key, and destroy the generated temporary public and private keys after the decryption is completed.

The second key factor is encrypted by using the temporary RSA public key. In the data backup process, another third-party application such as the Huawei wallet application or a server of the third-party application cannot obtain information about the second key factor. This may improve security of the data backup process.

913: The SE 30 determines the first backup key based on the first key factor and the second key factor, decrypts the first data by using the first backup key to restore the first data, and stores a plaintext of the first data in the security domain of the SE.

Specifically, the Huawei wallet application 12 imports the encrypted first data into the security domain 31 of the SE 30, and the SE invokes an applet (applet). The applet is used to determine the first backup key based on the first key factor and the second key factor, decrypt the first data by using the first backup key to obtain the decrypted first data, and store the decrypted first data in the security domain 31.

According to the foregoing technical solution, a mobile phone party cannot learn a third key factor delivered by a Huawei wallet application party, and the Huawei wallet application party cannot learn a fourth key factor generated by the mobile phone party or a fourth key factor delivered by an access card party. None of the parties can independently determine the second backup key. In other words, none of the parties can obtain the second data encrypted by using the second backup key. Therefore, when data is restored from the cloud server to the mobile phone, security of a data restoration process can be improved, to prevent any party from obtaining private data of the user. In addition, a part of sensitive data (for example, the first data) of a third-party card is stored in the SE. In a process of restoring content of the NFC card to the Huawei wallet application, a provider (for example, the access card party) is introduced to generate and deliver a key factor (for example, the second key factor). In other words, the provider is responsible for security management of the second key factor. In addition, in combination with another key factor (for example, the first key factor) provided by the mobile phone party (for example, a Huawei device), a real backup key (for example, the first backup key) is generated in the secure element SE of the mobile phone. In addition, a ciphertext obtained after the sensitive data (for example, the first data) of the card is encrypted by using the first backup key is obtained in the security domain of the SE. The ciphertext data may be restored. The mobile phone party (for example, the Huawei device) or a third party (for example, the access card party) cannot independently decrypt and restore the sensitive data of the user. This implements reliable and secure restoration of the data.

With reference to FIG. 1 to FIG. 9B, the foregoing describes the data encryption, data, data backup, and data restoration methods provided in the embodiments of this application. With reference to FIG. 10 to FIG. 13, the following describes data encryption, data, data backup, and data restoration apparatuses provided in the embodiments of this application.

Figure 10:
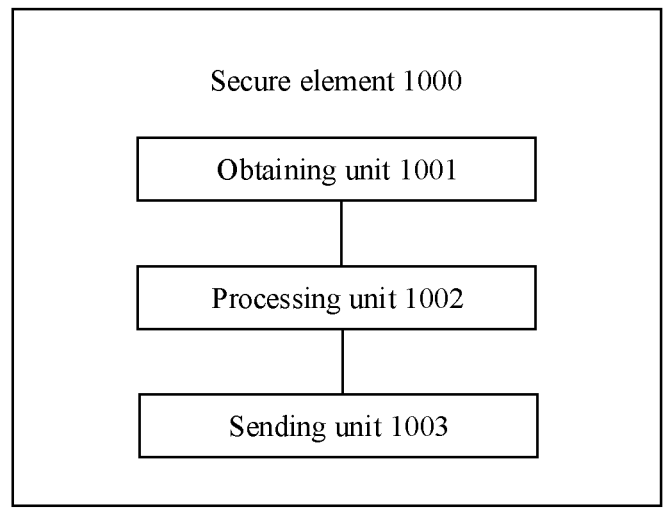
FIG. 10 is a schematic composition diagram of a secure element according to an embodiment of this application.

FIG. 10 is a schematic composition diagram of a secure element according to an embodiment of this application. As shown in FIG. 10, a secure element 1000 may correspond to the secure element SE 30 in FIG. 4, FIG. 5, FIG. 8A, FIG. 8B, FIG. 9A, or FIG. 9B. The secure element 1000 may include an obtaining unit 1001, a processing unit 1002, and a sending unit 1003.

For example, the obtaining unit 1001 may be configured to support the secure element 1000 in performing step 402 and step 403 in FIG. 4, the processing unit 1002 may be configured to support the secure element 1000 in performing step 404, and the sending unit 1003 may be configured to support the secure element 1000 in performing step 405.

Alternatively, the obtaining unit 1001 may be configured to support the secure element 1000 in performing step 501, step 502, and step 507 in FIG. 5, and the processing unit 1002 may be configured to support the secure element 1000 in performing step 508.

Alternatively, the obtaining unit 1001 may be configured to support the secure element 1000 in performing step 802 and step 803 in FIG. 8A, the processing unit 1002 may be configured to support the secure element 1000 in performing step 804, and the sending unit 1003 may be configured to support the secure element 1000 in performing step 806.

Alternatively, the obtaining unit 1001 may be configured to support the secure element 1000 in performing step 911 and step 912 in FIG. 9B, and the processing unit 1002 may be configured to support the secure element 1000 in performing step 913.

It should be noted that all related content of the steps in the foregoing method embodiments may be cited in function descriptions of corresponding functional modules. Details are not described herein again.

The secure element provided in this embodiment is configured to perform functions performed by the SE in the data encryption, data decryption, data backup, and data restoration methods. Therefore, same effect as the foregoing implementation methods can be achieved.

Optionally, in a possible implementation, the SE is an independent chip, and may include a processor and an interface. The processor and the interface cooperate with each other, so that the SE is enabled to perform functions performed by the SE in the data encryption, data decryption, data backup, and data restoration methods provided in this application.

In another possible implementation, the secure element SE may be integrated into a system on chip (system on chip, SOC), to implement a common platform for mobile payment and other services. In this case, the SE may not include a processor, but receives an instruction from a central processing unit, so that the SE is enabled to perform functions performed by the SE in the data encryption, data decryption, data backup, and data restoration methods provided in this application. This is not limited in this application.

Figure 11:
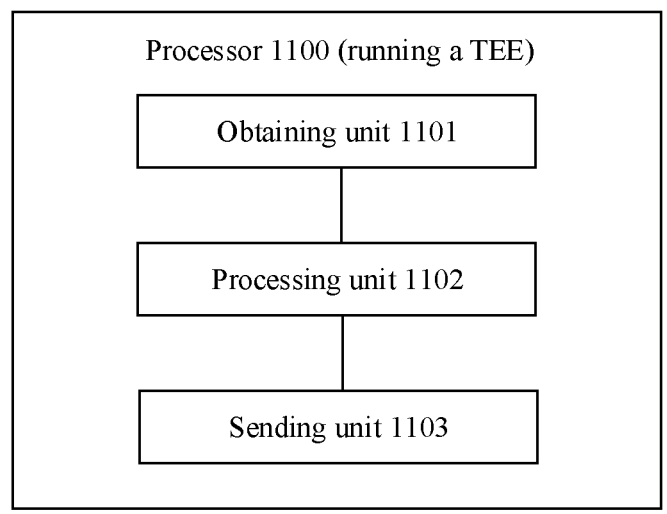
FIG. 11 is a schematic composition diagram of a trusted execution environment TEE according to an embodiment of this application.

FIG. 11 is a schematic composition diagram of a processor according to an embodiment of this application. The processor runs a trusted execution environment TEE. As shown in FIG. 11, a processor 1100 may correspond to the processor running the TEE in FIG. 6, FIG. 7, FIG. 8A, FIG. 8B, FIG. 9A, or FIG. 9B. It should be understood that the TEE may be a software package, and a unit or a module in the software package refers to a program or an algorithm that separately implements a function of the unit or the module. The processor 1100 may include an obtaining unit 1101, a processing unit 1102, and a sending unit 1103.

For example, the obtaining unit 1101 may be configured to support the processor 1100 in performing step 601, step 602, and step 603 in FIG. 6, the processing unit 1102 may be configured to support the processor 1100 in performing step 604, and the sending unit 1103 may be configured to support the processor 1100 in performing step 605.

Alternatively, the obtaining unit 1101 may be configured to support the processor 1100 in performing step 701, step 702, and step 707 in FIG. 7, the processing unit 1102 may be configured to support the processor 1100 in performing step 708, and the sending unit 1103 may be configured to support the processor 1100 in performing step 709.

Alternatively, the obtaining unit 1101 may be configured to support the processor 1100 in performing step 806, step 807, and step 808 in FIG. 8B, the processing unit 1102 may be configured to support the processor 1100 in performing step 809, and the sending unit 1103 may be configured to support the processor 1100 in performing step 812 or step 814.

Alternatively, the obtaining unit 1101 may be configured to support the processor 1100 in performing step 902 and step 905 in FIG. 9A, the processing unit 1102 may be configured to support the processor 1100 in performing step 906 and step 908, and the sending unit 1103 may be configured to support the processor 1100 in performing step 909.

It should be noted that all related content of the steps in the foregoing method embodiments may be cited in function descriptions of corresponding function modules. Details are not described herein again.

The TEE provided in this embodiment is configured to perform functions performed by the TEE in the data encryption, data decryption, data backup, and data restoration methods. Therefore, same effect as the foregoing implementation methods can be achieved.

Figure 12:
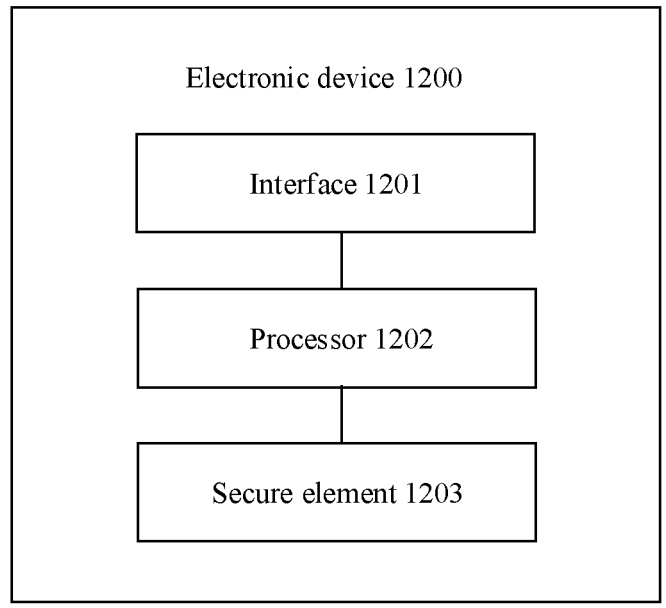
FIG. 12 is a schematic composition diagram of an electronic device according to an embodiment of this application.

FIG. 12 is a schematic composition diagram of an electronic device according to an embodiment of this application. As shown in FIG. 12, an electronic device 1200 may correspond to the electronic device in FIG. 2, or may correspond to the electronic device shown in the dashed box in FIG. 8A or FIG. 9A.

For example, the electronic device 1200 may include an interface 1201, a processor 1202, and a secure element 1203. A function of each unit may be implemented by hardware, or may be implemented by hardware executing corresponding software. The hardware or the software includes one or more modules or units corresponding to the foregoing function. In this application, the interface 1201, the processor 1202, and the secure element 1203 cooperate with each other, and computer instructions are executed to enable the electronic device to perform the data encryption, data decryption, data backup, and data restoration methods provided in the embodiments of this application.

Figure 13:
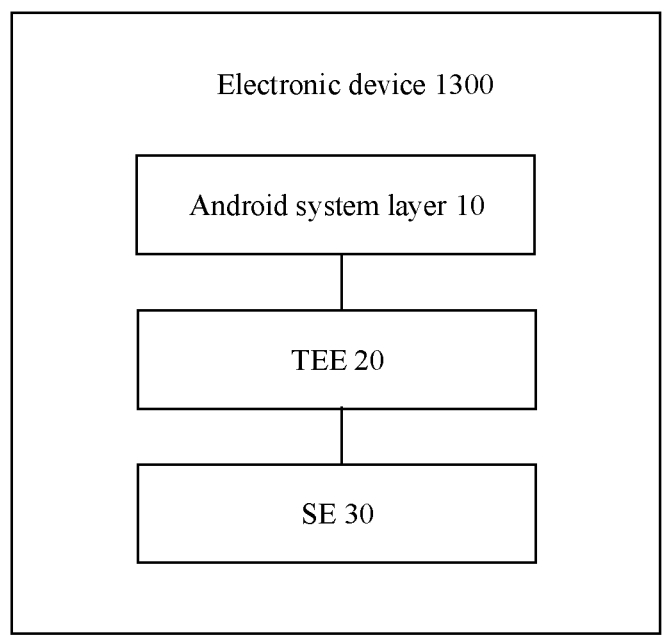
FIG. 13 is a schematic composition diagram of another electronic device according to an embodiment of this application.

FIG. 13 is a schematic composition diagram of another electronic device according to an embodiment of this application. As shown in FIG. 13, an electronic device 1300 may correspond to the electronic device in FIG. 2, or may correspond to the electronic device shown in the dashed box in FIG. 8A or FIG. 9A.

For example, the electronic device 1300 may include an Android system layer 10, a TEE 20, and an SE 30, and the Android system layer 10, the TEE 20, and the SE 30 cooperate with each other. Computer instructions are executed to enable the electronic device to perform the data encryption, data decryption, data backup, and data restoration methods provided in the embodiments of this application.

It may be understood that, to implement the foregoing functions, the electronic device includes corresponding hardware and/or software modules for performing the functions. With reference to algorithm steps of each example described in the embodiments disclosed in this specification, this application may be implemented in a form of hardware or a combination of hardware and computer software. Whether a function is performed by hardware or hardware driven by computer software depends on particular applications and design constraints of the technical solutions. A person skilled in the art may use different methods to implement the described functions for each particular application with reference to the embodiments, but it should not be considered that the implementation goes beyond the scope of the embodiments of this application.

In the embodiments, the electronic device may be divided into function modules based on the examples in the foregoing method. For example, each function module corresponding to each function may be obtained through division, or two or more functions may be integrated into one processing module. The integrated module may be implemented in a form of hardware. It should be noted that, in the embodiments, division into modules is an example, and is merely logical function division. In an actual implementation, another division manner may be used.

When an integrated unit is used, the electronic device may include a processing module, a storage module, and a communication module. The processing module may be configured to control and manage actions of the electronic device, for example, may be configured to support the electronic device to perform the steps. The storage module may be configured to support the electronic device to store program code, data, and the like. The communication module may be configured to support communication between the electronic device and another device.

The processing module may be a processor or a controller. The processing module may implement or execute various example logical blocks, modules, and circuits described with reference to content disclosed in this application. Alternatively, the processor may be a combination of processors implementing a computing function, for example, a combination of one or more microprocessors, or a combination of a digital signal processor (digital signal process, DSP) and a microprocessor. The storage module may be a memory. The communication module may be specifically a device, for example, a radio frequency circuit, a Bluetooth chip, or a Wi-Fi chip, that interacts with another electronic device.

In an embodiment, when the processing module is a processor and the storage module is a memory, the electronic device in this embodiment may be the device shown in FIG. 12 or FIG. 13.

further provides a computer storage medium. The computer storage medium stores computer instructions. When the computer instructions are run on an electronic device, the electronic device performs the foregoing related method steps to implement the data encryption, data decryption, secure data backup, and secure data restoration methods in the foregoing embodiments.

further provides a computer program product. When the computer program product runs on a computer, the computer is enabled to perform the foregoing related steps, to implement the data encryption, data decryption, secure data backup, and secure data restoration methods in the foregoing embodiments.

In addition, an embodiment of this application further provides an apparatus. The apparatus may be specifically a chip, a component, or a module. The apparatus may include a processor and a memory that are connected to each other. The memory is configured to store computer executable instructions. When the apparatus runs, the processor may execute the computer executable instructions stored in the memory, to enable the chip to perform the data encryption, data decryption, secure data backup, secure data restoration methods in the foregoing method embodiments.

The electronic device, the computer storage medium, the computer program product, or the chip provided in the embodiments may be configured to perform the corresponding method provided above. Therefore, for beneficial effects that can be achieved, refer to the beneficial effects of the corresponding method provided above. Details are not described herein again.

The foregoing descriptions about implementations allow a person skilled in the art to understand that, for convenient and brief description, division of the foregoing function modules is taken as an example for illustration. In actual application, the foregoing functions can be allocated to different modules and implemented according to a requirement, that is, an inner structure of an apparatus is divided into different function modules to implement all or some of the functions described above.

In the several embodiments provided in this application, it should be understood that the disclosed apparatus and method may be implemented in other manners. For example, the described apparatus embodiment is merely an example. For example, division into the modules or units is merely logical function division and may be other division in an actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected based on an actual requirement to achieve objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of this application essentially, or the part contributing to the conventional technology, or all or some of the technical solutions may be implemented in the form of a software product. The software product is stored in a storage medium and includes several instructions for instructing a device (which may be a single-chip microcomputer, a chip or the like) or a processor (processor) to perform all or some of the steps of the methods described in the embodiments of this application. The storage medium includes: any medium that can store program code, such as a USB flash drive, a removable hard disk, a readonly memory (readonly memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A data encryption method, wherein the method is performed by an electronic device, the electronic device comprises a secure element and a processor, wherein the processor runs a trusted execution environment (TEE), and the method comprises:
   obtaining, by the secure element, first data, wherein the first data is about a first card added to a first application;
   receiving, by the secure element, a first key factor from a trusted service manager (TSM);
   receiving, by the secure element, a second key factor from a server corresponding to the first card;
   generating, by the secure element, a first backup key based on the first key factor and the second key factor; and
   encrypting, by the secure element, the first data by using the first backup key;
   obtaining, by the processor, second data, wherein the second data comprises data, in the first application, that is about an application system layer of the first card;

receiving, by the processor, a third key factor from a server corresponding to the first application, wherein the third key factor is a key factor generated based on user information in the first application;

obtaining, by the processor, a fourth key factor;

generating, by the processor, a second backup key based on the third key factor and the fourth key factor; and encrypting, by the processor, the second data by using the second backup key.

2. The method according to claim 1, wherein the second data further comprises the first data encrypted by using the first backup key, and before the obtaining, by the processor, second data, the method further comprises:

receiving, by the processor, the first data that is encrypted by using the first backup key from the secure element, wherein after the encrypting, by the processor, the second data by using the second backup key, the method further comprises:

uploading, by the processor, the encrypted second data to a cloud server for backup.

3. The method according to claim 1, wherein the fourth key factor is a key factor generated by the server corresponding to the first card and sent to the processor.

4. The method according to claim 1, wherein the fourth key factor is a key factor randomly generated by a trusted application (TA) in the TEE run by the processor, and the method further comprises:

sending, by the processor, the fourth key factor to the server corresponding to the first card, wherein the fourth key factor is encrypted by using the third key factor; or sending, by the processor, the fourth key factor to the server corresponding to the first application, wherein the fourth key factor is encrypted by using the third key factor.

5. The method according to claim 4, wherein before the sending, by the processor, the fourth key factor to the server corresponding to the first card, or sending, by the processor, the fourth key factor to the server corresponding to the first application, the method further comprises:

encrypting, by the processor, the fourth key factor according to a first authentication manner, wherein the first authentication manner uses a password entered by a user to encrypt the fourth key factor.

6. The method according to claim 1, wherein the third key factor received by the processor and from the server corresponding to the first application is encrypted by using a public key in a temporary key pair.

7. The method according to claim 1, wherein the second key factor received by the secure element and from the server corresponding to the first card is encrypted by the TSM by using the public key in a temporary key pair.

8. The method according to claim 1, wherein the first application is a wallet application.

9. A data decryption method, wherein the method is performed by an electronic device, the electronic device comprises a secure element and a processor, wherein the processor runs a trusted execution environment (TEE), and the method comprises:

obtaining, by the secure element, first data that has been encrypted;

receiving, by the secure element, a first key factor from a trusted service manager (TSM), wherein the first key factor is a key factor generated based on user information in a first application;

receiving, by the secure element, a second key factor from a server corresponding to the first card;

determining, by the secure element, the first backup key based on the first key factor and the second key factor; and decrypting, by the secure element, the first data by using the first backup key, to obtain the first data;

obtaining, by the processor, second data that has been encrypted;

receiving, by the processor, a third key factor from a server corresponding to the first application;

obtaining, by the processor, a fourth key factor;

determining, by the processor, the second backup key based on the third key factor and the fourth key factor; and decrypting, by the processor, the second data by using the second backup key, to obtain the second data.

10. The method according to claim 9, wherein the second data further comprises the first data, and after the decrypting, by the processor, the second data by using the second backup key, to obtain the second data, the method further comprises:

sending, by the processor, the first data to the secure element; and sending, by the processor, a portion of the second data to an application system layer of the electronic device.

11. The method according to claim 9, wherein the fourth key factor is a key factor generated by the server corresponding to the first card and sent to the processor.

12. The method according to claim 9, wherein the fourth key factor is a key factor randomly generated by a trusted application (TA) in the TEE run by the processor, and the method further comprises:

receiving, by the processor, the fourth key factor from the server corresponding to the first card, wherein the fourth key factor is encrypted by using the third key factor; or receiving, by the processor, the fourth key factor from the server corresponding to the first application, wherein the fourth key factor is encrypted by using the third key factor.

13. The method according to claim 12, wherein after the receiving, by the processor, the fourth key factor from the server corresponding to the first card, or receiving, by the processor, the fourth key factor from the server corresponding to the first application, the method further comprises:

decrypting, by the processor, the fourth key factor according to a first authentication manner, wherein the first authentication manner is an authentication manner in which a user enters a password.

14. The method according to claim 9, wherein the third key factor received by the processor and from the server corresponding to the first application is encrypted by using a public key in a temporary key pair.

15. The method according to claim 9, wherein the second key factor received by the secure element and from the server corresponding to the first card is encrypted by a trusted service manager (TSM) by using a public key in a temporary key pair.

16. The method according to claim 9, wherein the first application is a wallet application.

17. An electronic device comprising:

a secure element comprising a circuit, the secure element configured to:

obtain first data, wherein the first data is data that is about a first card and that is written into the secure element when the first card is added to a first application;

receive a first key factor from a trusted service manager (TSM);

receive a second key factor from a server corresponding to the first card;
generate a first backup key based on the first key factor and the second key factor; and
encrypt the first data by using the first backup key; and
a processor configured to run a trusted execution environment (TEE), and further configured to:
obtain second data, wherein the second data comprises data, in the first application, that is about an application system layer of the first card;
receive a third key factor from a server corresponding to the first application, wherein the third key factor is a key factor generated based on user information in the first application;
obtain a fourth key factor;
generate a second backup key based on the third key factor and the fourth key factor; and
encrypt the second data by using the second backup key.

18. The electronic device according to claim 17, wherein the second data further comprises the first data encrypted by using the first backup key, and before the obtaining second data, the processor is further configured to:
receive the first data that is encrypted by using the first backup key from the secure element, wherein after the encrypting the second data by using the second backup key, the processor is further configured to:
upload the encrypted second data to a cloud server for backup.

19. An electronic device comprising:
a secure element comprising a circuit, the secure element configured to:
obtain first data that has been encrypted;
receive a first key factor from a trusted service manager (TSM), wherein the first key factor is a key factor generated based on user information in a first application;
receive a second key factor from a server corresponding to the first card;
determine the first backup key based on the first key factor and the second key factor; and
decrypt the first data by using the first backup key, to obtain the first data; and
a processor configured to run a trusted execution environment (TEE), and further configured to:
obtain second data that has been encrypted;
receive a third key factor from a server corresponding to the first application;
obtain a fourth key factor;
determine a second backup key based on the third key factor and the fourth key factor; and
decrypt the second data by using the second backup key, to obtain the second data.

20. The electronic device according to claim 19, wherein the second data further comprises the first data, and after the decrypting the second data by using the second backup key, to obtain the second data, the processor is further configured to:
send the first data to the secure element; and
send a portion of the second data to an application system layer of the electronic device.

* * * * *